(12) United States Patent
Schliwa et al.

(10) Patent No.: US 11,945,603 B2
(45) Date of Patent: Apr. 2, 2024

(54) FREIGHT CARRIER FOR ACCOMMODATION IN THE CARGO HOLD OF AN AIRCRAFT

(71) Applicant: Airbus Operations GmbH, Hamburg (DE)

(72) Inventors: Ralf Schliwa, Hamburg (DE); Gunda Hülsen, Hamburg (DE); Uwe Panzram, Hamburg (DE); Hermann Benthien, Hamburg (DE); Lars Uwe Hansen, Hamburg (DE); Paul Adrian Wichtmann, Hamburg (DE); Dirk Meiranke, Hamburg (DE); Thomas Grabow, Hamburg (DE)

(73) Assignee: Airbus Operations GmbH, Hamburg (DE)

(\*) Notice: Subject to any disclaimer, the term of this patent is extended or adjusted under 35 U.S.C. 154(b) by 125 days.

(21) Appl. No.: 17/733,660

(22) Filed: Apr. 29, 2022

(65) Prior Publication Data

US 2022/0332418 A1 Oct. 20, 2022

Related U.S. Application Data

(63) Continuation of application No. PCT/EP2020/079842, filed on Oct. 23, 2020.

(30) Foreign Application Priority Data

Oct. 30, 2019 (DE) .......................... 102019129389.8
Apr. 17, 2020 (DE) .......................... 102020110598.3

(51) Int. Cl.
*B64F 1/32* (2006.01)
*B64C 1/20* (2006.01)
*B64D 9/00* (2006.01)

(52) U.S. Cl.
CPC ................... *B64D 9/00* (2013.01); *B64C 1/20* (2013.01); *B64F 1/322* (2020.01); *B64D 2009/006* (2013.01)

(58) Field of Classification Search
CPC ...... B64C 1/20; B64D 9/00; B64D 2009/006; B64F 1/322
See application file for complete search history.

(56) References Cited

U.S. PATENT DOCUMENTS

| 1,892,406 A | 12/1932 | Rudolph et al. |
| 2,918,183 A | 12/1959 | Petersen et al. |

(Continued)

FOREIGN PATENT DOCUMENTS

| DE | 1946690 U | 9/1966 |
| DE | 9410660 U1 | 11/1995 |

(Continued)

OTHER PUBLICATIONS

German Search Report for Application No. 102020110598 dated Nov. 11, 2020.

(Continued)

*Primary Examiner* — Tye William Abell
(74) *Attorney, Agent, or Firm* — KDW Firm PLLC

(57) ABSTRACT

A load carrier for an aircraft cargo hold includes a bottom element with a support surface, the load carrier being movable over a floor surface in a floor plane while the support surface faces the floor surface, the bottom element having a base surface. The support surface has rolling elements rotatable about a rotation axis oriented where a parallel to the axis runs parallel to the floor plane, and the rolling elements being retained on the bottom element where the rotation axis of each of the rolling elements can be rotated about a vertical axis running perpendicularly to the floor plane. A load carrier can include a bottom element, the (Continued)

support surface of which has outlet openings, through which air can exit from the support surface to form an air cushion under the support surface. A load carrier can include a bottom element the support surface of which has slider elements.

23 Claims, 9 Drawing Sheets

(56) References Cited

U.S. PATENT DOCUMENTS

| | | | |
|---|---|---|---|
| 2,981,350 | A | 4/1961 | Zouck et al. |
| 3,948,344 | A * | 4/1976 | Johnson ................ B65D 19/00 |
| | | | 414/676 |
| 4,060,252 | A | 11/1977 | Mowery |
| 4,108,455 | A | 8/1978 | James |
| 9,156,553 | B1 * | 10/2015 | Johnson .................. B64D 7/00 |
| 9,315,322 | B1 | 4/2016 | Majied et al. |
| 10,196,146 | B2 * | 2/2019 | Himmelmann ........... B64C 1/22 |
| 2006/0279054 | A1 * | 12/2006 | Chung ................. A45C 13/385 |
| | | | 280/79.11 |
| 2011/0247958 | A1 | 10/2011 | Lucas et al. |
| 2012/0325969 | A1 | 12/2012 | Helmner |

FOREIGN PATENT DOCUMENTS

| | | |
|---|---|---|
| DE | 102005051987 A1 | 5/2007 |
| DE | 202008002302 U1 | 4/2008 |
| DE | 102008038637 A1 | 2/2010 |
| DE | 102014003210 B3 | 5/2015 |
| EP | 0 663 350 A1 | 7/1995 |
| EP | 2 492 217 A1 | 8/2012 |
| EP | 3 006 329 B1 | 12/2018 |
| EP | 3 006 341 B1 | 12/2018 |
| ES | 1045964 U | 11/2000 |
| JP | 2010173765 A | 8/2010 |
| JP | 2011116451 A | 6/2011 |
| JP | 2013060253 A | 4/2013 |
| JP | 2018127328 A | 8/2018 |
| WO | WO2008/130193 A1 | 10/2008 |

OTHER PUBLICATIONS

International Search Report and Written Opinion for Application No. PCT/EP2020/079842 dated Apr. 23, 2021.

* cited by examiner

FREIGHT CARRIER FOR ACCOMMODATION IN THE CARGO HOLD OF AN AIRCRAFT

CROSS-REFERENCE TO RELATED APPLICATIONS

This application is a continuation of and claims priority to Patent Application No. PCT/EP2020/079842 filed Oct. 23, 2020 which claims priority to German Patent Application No. DE 10 2020 110 598.3 filed Apr. 17, 2020 and German Patent Application No. DE 10 2019 129 389.8 filed Oct. 30, 2019, the entire disclosures of which are incorporated by reference herein.

TECHNICAL FIELD

The disclosure herein relates to a freight carrier for accommodation in the cargo hold of an aircraft, to a system composed of a freight carrier and a blower unit, and to a method for loading the cargo hold of an aircraft.

BACKGROUND

It is known from the prior art that the cargo hold of an aircraft is loaded in such a way that individual elements of freight are loaded into so-called freight containers of a dimensionally stable material, such as aluminum sheet, and these freight containers then are conveyed into the cargo hold. Required to this end is a first conveying installation by which the freight containers can be conveyed to the entrance to the cargo hold, on the one hand. Required on the other hand within the cargo hold is a second conveying installation such as a roller deck, for example, a drive and a roller system, thus a so-called cargo loading system, by way of which the freight containers can be conveyed on the floor area of the cargo hold from the entrance to the final position within the cargo hold.

The freight containers per se, as well as the cargo loading system within the cargo hold, can be of a not insignificant weight, whereas it is desirable to keep the weight of an aircraft as low as possible in order for the fuel consumption of the latter to be minimized.

It is known from DE 10 2008 038 637 A1 for a freight container to be provided with wheels in the region of the floor of the container, the wheels with the aid of an activation installation being able to be moved back and forth between a retracted and a deployed position. In this construction, the mechanically complex construction of the floor region of the freight containers is disadvantageous. Furthermore, punctiform overloading of the cargo deck and wear may arise by virtue of the wheels.

EP 3 006 329 B1 and EP 3 006 341 B1 each describe that supports are attached so as to be displaceable on the floor area of the cargo hold of an aircraft, the supports having a blower unit by way of which the supports can be lifted in relation to the floor area. Freight containers which are disposed on rails provided on the floor surface can initially be lifted by supports once the latter have been pushed under the containers. The containers can then be displaced by the supports. In order for the containers to be set down, the blower unit of the supports is then deactivated again, and the supports can then be extracted from below the displaced container because the latter bears on the rails again.

In this context, it is furthermore known from EP 2 492 217 A1 for a container of a textile material to be used as a freight container, the latter having planar reinforcement elements. In a container of this type it is disadvantageous that the latter per se can be moved only with difficulty even across a flat floor area of a cargo hold so that conveying installations which per se are associated with a significant weight are still required as before.

SUMMARY

Proceeding from the prior art, it is therefore the object of the disclosure herein to design those parts that are used for loading the cargo hold of an aircraft and remain on board the aircraft during the flight so as to be as light as possible but to nevertheless enable simple loading.

According to a first aspect of the disclosure herein, this object is achieved by a freight carrier for accommodation in the cargo hold of an aircraft, having a base element that has a bearing face that is designed to bear on a floor area of a cargo hold of an aircraft;
wherein the freight carrier is designed to be moved across the floor area extending in a floor plane such that the bearing face faces the floor area;
wherein the base element has a base area which is disposed on that side of the base element that faces away from the bearing face;
wherein the bearing face is provided with a multiplicity of rolling elements, wherein each of the rolling elements is rotatable about a rotation axis, wherein the rotation axis is aligned in such a manner that a parallel to the rotation axis that extends through the contact point between the rolling element and the floor area runs parallel to the floor plane; and
wherein the rolling elements are mounted on the base element such that the rotation axis of each of the rolling elements is rotatable about a vertical axis which runs parallel to an axis that in the contact point between the rolling element and the floor area extends perpendicularly to the floor area.

Using the freight carrier according to the disclosure herein, the cargo hold of an aircraft can be loaded with cargo in the following way.

First, cargo can be disposed on the base area of the freight carrier. The cargo can be passenger baggage, for example. On the other hand however, it is also possible that the cargo is formed by freight independent of the passengers of the aircraft. The cargo can thus assume arbitrary different shapes and sizes, the latter having only to be chosen such that the cargo does not extend beyond the volume which the loaded freight carrier is to occupy in the cargo hold of the aircraft.

Once the freight carrier has been loaded with cargo, the cargo carrier can be moved using a conveying installation which per se is known from the prior art and be transported into the cargo hold of the aircraft by the conveying installation.

In one preferred design embodiment, the conveying installation is configured in such a manner that the latter has a revolving conveyor belt which is formed from an elastic material, wherein the conveyor belt can be disposed such that the conveyor belt extends from a loading region, adjacent to the apron on which the aircraft to be loaded and the conveying installation are situated, to a cargo hold opening of the aircraft, so that the freight carrier can be moved onto the conveyor belt in the loading region and be conveyed by the conveyor belt to the cargo hold opening.

In general, and in particular in the context with the conveying installation described above which conjointly with the freight carriers can form a system, the circumference about which the rolling elements project beyond the bearing face of the base element of the freight carriers is preferably chosen such that, when the freight carriers are situated on the conveyor belt of the conveying installation, the rolling elements sink into the conveyor belt so that the freight carriers by way of the bearing face thereof then bear on the conveyor belt and therefore are unable to shift or roll on the conveyor belt.

The rolling elements provided on the bearing face make it possible for the freight carrier to be able to be moved in a simple manner across the floor area of the cargo hold. By virtue of the rotatability of the rolling elements about a vertical axis which runs parallel to an axis that in the contact point between the rolling element and the floor area extends perpendicularly to the floor area in which the floor area of the cargo hold extends, the freight carrier can be moved across the floor area in arbitrary directions, wherein the force required to this end is comparatively minor by virtue of the rotatable rolling elements, this being able to be performed manually. It is advantageous here for the rolling elements to have a high coefficient of friction in relation to the floor area of the cargo hold so that it is ensured that the rolling elements actually roll and do not slide across the floor area. It is in particular not necessary that a special freight loading system which would be associated with an additional weight for the aircraft is provided in the cargo hold to this end. It is also included in such an arrangement that the vertical axis and the rotation axis of the rolling elements intersect.

In one preferred embodiment, the rolling elements are configured as preferably cylindrical rollers which in a mount are mounted so as to be rotatable about the rotation axis of the rollers, wherein the mount is attached to the floor area so as to be rotatable about the vertical axis. In this embodiment, the rotatability of the rollers about the rotation axis thereof and the rotatability of the rollers about the vertical axis is implemented by rotary bearings which are configured in a mutually separate manner. The latter can in each case thus be adapted specially to the forces acting so as to be perpendicular to the rotation axis, on the one hand, and parallel to the vertical axis, on the other hand.

It is furthermore preferable for the rollers in the external face to have at least one helically encircling groove. This results in the advantage that the rollers, when moving in a predefined direction, are rapidly aligned such that the rotation axis of the rollers is aligned so as to be perpendicular to the direction, as a result of which the resistance put up by the freight carrier counter to a movement across the floor area in the cargo hold is very rapidly minimized.

It is furthermore preferable for the rollers to have mutually separate roller portions, wherein the roller portions can be rotated about the rotation axis in a mutually independent manner. The vertical axis preferably runs in a separation plane between the roller portions. In such a construction, the roller portions can rotate counter to one another, this being associated with the advantage that, when the freight carrier is pushed in a predefined direction, the rollers are aligned particularly easily such that the rotation axis of the rollers is aligned so as to be perpendicular to the predefined direction of movement of the freight carrier, and the freight carrier then can easily be displaced on the floor area of a cargo hold.

However, it is also conceivable that the rolling elements are configured as balls which, in a mount provided on the base element, are rotatably received in such a manner that the balls are freely rotatable, and part of the ball extends from the mount toward the floor area.

In this embodiment it is achieved that the rotatability of the rolling elements about the rotation axis and the vertical axis is achieved in a simple manner by way of a uniform bearing. Moreover, the resistance which the freight carrier puts up counter to a change of direction when moving across the floor area is very minor.

In the scope of the achievement of the above object according to this aspect, a system for loading a cargo hold of an aircraft with a freight element is also provided, wherein the system comprises:

a freight carrier for receiving the freight element, according to the previously described embodiments of this aspect; and a conveying installation for transporting the freight carrier, having a revolving conveyor belt onto which the freight carrier can be placed when transported and which is formed from an elastic material, wherein the conveyor belt can be disposed such that the conveyor belt extends from a loading region, adjacent to the apron on which the aircraft to be loaded and the conveying installation are situated, to a loading hatch of the aircraft;

wherein the rolling elements of the freight carrier in a circumference project beyond the bearing face of the base element, the circumference being chosen such that, when the freight carrier is situated on the conveyor belt, the rolling elements sink into the conveyor belt and the bearing face of the freight carrier bears on the conveyor belt.

As a result of the conveyor belt and the freight carriers being mutually adapted and the rolling elements sinking into the conveyor belt so far that the conveyor belt bears on that bearing face of the freight carrier that faces the conveyor belt, it is reliably prevented that the freight carriers shift on the conveyor belt when the conveyor belt runs so as to be inclined from the apron to the loading hatch of the aircraft to be loaded. In this instance, no additional securing measures on the conveying installation, or design embodiments of the conveyor belt, are required in order to prevent shifting.

According to a further aspect of the disclosure herein, the above object is achieved by a freight carrier for accommodation in the cargo hold of an aircraft, having a base element which has a bearing face which is designed in such a manner that the freight carrier can bear on a floor area of a cargo hold of an aircraft such that the bearing face lies opposite the floor area;

wherein the freight carrier is designed to be moved across a floor area extending in a floor plane such that the bearing face faces the floor area;

wherein the base element has a base area which is disposed on that side of the base element that faces away from the bearing face;

wherein at least one annular element, which is mounted so as to revolve in an orbital plane on the freight carrier so that a portion of the at least one annular element extends along the bearing face and is displaceable relative to the latter, is provided; and wherein the portion of the at least one annular element is disposed on the bearing face in such a manner that, when the bearing face moves across the floor area, the portion bears on the floor area and is displaced in relation to the bearing face in the orbital plane.

In this aspect of the disclosure herein, the freight carrier has one or a plurality of annular elements which revolve in an orbital plane and are mounted in this orbital plane on the freight carrier such that the annular element can rotate about the region enclosed by it in the orbital plane. Accordingly, the revolving annular elements are mounted on the freight carrier in the fashion of a continuous track of a tracked vehicle. It is possible here for the annular element to enclose the freight carrier including the region in which the cargo is received. However, it is also possible for the annular element to revolve only about the base element or part of the latter.

In the achievement according to this aspect of the disclosure herein it is also made possible that the freight carrier according to the disclosure herein, once cargo has been placed on the base area thereof and the freight carrier can be conveyed into the cargo hold of an aircraft by a conveying installation, can be moved and positioned in the cargo hold without any freight loading system of a potentially complex construction being required in the cargo hold.

In the construction according to this aspect, the freight carrier is initially conveyed into the cargo hold by the conveying installation such that the annular element or elements, when transported to the cargo hold opening disposed laterally on the cargo hold, extend in a plane which extends into the cargo hold opening so as to be perpendicular to the transport direction. Once the freight carrier has then been conveyed into the cargo hold, the freight carrier can subsequently be displaced in the longitudinal direction of the cargo hold, wherein the annular element or elements in this displacement movement move about the freight carrier as an entity, the base element, or else a part thereof, like the continuous track of a tracked vehicle.

This design embodiment of a freight carrier is particularly suitable for receiving also heavy loads on the freight carrier, because the load can be absorbed by the floor area across the entire length of that part of the annular elements that faces the floor area. It is specifically avoided in this way that the load is introduced into the floor area in a punctiform manner.

In one preferred embodiment, the annular element is configured as a flexible belt, preferably configured from rubber. This represents a possibility for implementing the annular element in a manner that is simple to produce. Moreover, it is prevented as a result of the choice of the rubber material that the annular element is easily displaced in relation to the floor area and no longer revolves about the freight carrier or a part thereof. However, revolving specifically ensures that the freight carrier moves along the direction established by the orbital planes.

In one preferred embodiment of this aspect, the annular element can revolve about the external wall of the freight carrier. However, it is also possible for the annular element to revolve about the base element or else only part of the latter. In any case however, a portion of the annular element extends along the bearing face such that this portion comes to bear on the floor area.

It is furthermore advantageous for the annular elements to have a high coefficient of friction in relation to the floor area of the cargo hold so that it is ensured that the annular elements do not actually slide across the floor area but that the annular elements perform a revolving movement when the freight carrier is being displaced.

It is furthermore preferable for the annular element in a circumference to project beyond the bearing face of the base element, the circumference being chosen such that, when the freight carrier is situated on the conveyor belt of a conveying installation, the annular element sinks into the conveyor belt and the bearing face bears on the conveyor belt. In such a construction it is reliably prevented as a result of the contact between the conveyor belt and the bearing face over a large area that the freight carrier can shift in relation to the conveyor belt when the latter is obliquely positioned.

Moreover provided in the context of the achievement of the above object according to this aspect is a system for loading a cargo hold of an aircraft with a freight element, wherein the system comprises:

a freight carrier for receiving the freight element, according to the previously described embodiments of this aspect; and a conveying installation for transporting the freight carrier, having a revolving conveyor belt onto which the freight carrier can be placed when transported and which is formed from an elastic material, wherein the conveyor belt can be disposed such that the latter extends from a loading region, adjacent to the apron on which the aircraft to be loaded and the conveying installation are situated, to a loading hatch of the aircraft;

wherein the annular element of the freight carrier in a circumference projects beyond the bearing face of the base element, the circumference being chosen such that, when the freight carrier is situated on the conveyor belt of the conveying installation, the annular element sinks into the conveyor belt and the bearing face of the freight carrier bears on the conveyor belt.

As a result, the conveyor belt and the freight carriers are mutually adapted, and the annular element sinks into the conveyor belt so far that the conveyor belt bears on that bearing face of the freight carrier that faces the conveyor belt. It is reliably prevented in this way that the freight carriers shift on the conveyor belt when the conveyor belt runs so as to be inclined from the apron to the loading hatch of the aircraft to be loaded.

According to a further aspect of the disclosure herein, the above object is achieved by a freight carrier for accommodation in the cargo hold of an aircraft, having a base element that has a bearing face which is designed in such a manner that the freight carrier can bear on a floor area of a cargo hold of an aircraft such that the bearing face lies opposite the floor area;

wherein the base element has a base area which is disposed on that side of the base element that faces away from the bearing face;

wherein outlet openings through which air from the bearing face can exit so as to form an air cushion below the bearing face are provided in the bearing face;

wherein a connector is provided;

wherein a connection assembly that connects the connector to the outlet openings is provided; and wherein the connector is designed so as to be releasably connected to the outlet of a blower unit so that an air flow from the blower unit through the connector and the connection assembly to the outlet openings and out of the latter can be generated.

When loading a freight element into the cargo hold of an aircraft, the freight carrier according to the disclosure herein and according to this aspect makes the following procedure possible:

At least one freight element is initially placed on the base area of the freight carrier, the latter initially being situated outside the cargo hold. For example, a single freight element can be so large that the latter on its own almost completely fills the base area. However, it is likewise conceivable that a multiplicity of freight elements are initially placed onto the base area, optionally also stacked on top of one another.

As a result of that bearing face of the freight carrier that faces downward toward the floor area of a cargo hold being provided with outlet openings which by way of the connection assembly are connected to a connector, a blower unit can be connected to the connector either before or after the freight element or freight elements have been placed on the base area, the blower unit being set in operation after the placing. As a result, an air flow which runs from the blower unit through the outlet of the latter into the connector of the base element, and from there onward through the connection assembly to the outlet openings, can in turn be generated.

As a result of this air flow, an air cushion is formed below the bearing face of the freight carrier, this making it possible for the freight carrier having the freight element or freight elements to be manually displaced without any great resistance. In this way, the freight carrier in this instance can be displaced by a user across transport planes into the cargo hold and from there onward across the floor area thereof to the desired final position, the user in a preferred embodiment carrying the blower unit on his/her back. Once the final position in the cargo hold has been reached, the connector on the base element and the outlet of the blower unit are disconnected from one another so that the air cushion collapses and the freight carrier stands firmly on the base area. The user can now displace further freight carriers into the cargo hold in the manner already described, wherein the user connects the outlet of the blower unit to the connector of the freight carrier currently to be displaced.

In order for the cargo hold to be unloaded, the procedure is performed in the reverse order, i.e. the blower unit is connected to the connector of the freight carrier to be conveyed out of the cargo hold, and an air cushion is built up between the bearing face of the freight carrier and the floor area of the cargo hold once the blower unit has been set in operation. The freight carrier can then be easily pushed by hand across the floor area to the loading hatch of the cargo hold and from there be pulled out of the aircraft across a transport plane.

When using the freight carrier according to this aspect of the disclosure herein, only the freight carrier remains in the cargo hold in the loaded state, while the blower unit has to be available in each case at the loading location and the unloading location and does not have to remain in the aircraft during the flight. Moreover, it is not necessary for conveying installations such as conveyor belts or roller assemblies to be provided in the cargo hold, the conveyor belts and roller assemblies increasing the weight of the aircraft. Therefore, a weight-saving possibility for receiving freight elements in a cargo hold is provided as a result of the use of the freight carriers according to the disclosure herein.

The connection assembly can preferably be configured as a line assembly comprising a multiplicity of line portions which are provided between the outlet openings and the connector so as to fluidically connect the latter to the outlet openings. However, it is also conceivable for the connection assembly to be configured as a cavity in the base element, the cavity being fluidically connected to the connector and the outlet openings. However, other possibilities by way of which the connector is fluidically connected to the outlet openings are also conceivable, and the disclosure herein is not limited to these two possibilities. It is essential that the connection assembly provides a fluidic connection between the connector and the outlet openings.

Provided in one preferred design embodiment of this aspect are clearances which extend away from the bearing face so that the base of the clearances is spaced apart from the bearing face, wherein the outlet openings are disposed in the clearances. When air exits the outlet openings in this design embodiment of the freight carrier according to the disclosure herein, a pressure can be built up in the clearances in the region between the base and the plane that is defined by the bearing face. The pressure in this instance contributes toward the base element, and thus the freight carrier, being lifted from the floor area at least to a minor degree. In this way, an air cushion between the bearing face and the floor area of the cargo hold can effectively be built up by way of this preferred embodiment. In this embodiment it is particularly preferable for the outlet openings to be disposed in the base of the clearances.

In embodiments of this aspect of the disclosure herein, it is furthermore possible for the bearing face to be provided with encircling sealing elements about the individual outlet openings and/or along the external periphery of the bearing face, so as to maintain the air cushion below the base element.

In a further preferred embodiment of this aspect, the connector by way of which the base element can be releasably connected to a blower unit, so as to generate an air flow through the connection assembly to the outlet openings and out of the latter, is provided in the base element. This has the advantage that no connection lines or similar project from the freight carrier in this instance, the connection lines or similar potentially impeding the loading of the base element with freight elements or potentially increasing the minimum spacing from further base elements.

In this aspect of the disclosure herein, in a preferred embodiment as an alternative to the previously explained design embodiment, the connector is disposed so as to be spaced apart from the base element, wherein a line element which extends from the base element to the connector and connects the connector to the connection assembly is provided. This embodiment makes it possible that the blower unit for displacing the base element can be connected to the base element in a simple manner, because the line element can be aligned with the blower unit, in particular when the line element is of a flexible design. In this way, a hose on the blower unit can be embodied with a shorter length, this improving the handling of the hose, since a long hose can easily interfere.

In this aspect of the disclosure herein it is furthermore preferable for the base element to have a lateral face which extends from the bearing face to the base area and encircles the base element, wherein two parallel-running ducts are provided, wherein each of the ducts has at least one inlet opening in the lateral face and from the inlet opening extends parallel to the bearing face. The ducts are designed and disposed in the base element such that the fork of a forklift truck can be received in the ducts. In this preferred embodiment, the outlet openings are furthermore connected to a first one of the ducts in such a manner that an air flow from the first one of the ducts through the outlet openings connected to the latter can be generated so that the first one of the ducts is at least part of the connection assembly, wherein the connector is connected to the first one of the ducts. Finally provided is a closing element or mechanism for closing the at least one inlet opening of the first one of the ducts.

In this preferred embodiment the base element has an encircling lateral wall which between the bearing face and the base area extends about the base element and preferably runs perpendicularly to the bearing face. Two ducts which extend so as to be mutually parallel and are designed and sized such that the fork of a forklift truck can be received in the ducts emanate from the lateral face. As a result, the freight carrier can also be easily transported by a forklift truck.

Furthermore, the outlet openings are disposed in the base element such that the outlet openings are fluidically connected to a first one of the ducts. Moreover, the first one of the ducts is connected to the connector. The first one of the ducts thus forms a portion of the connection assembly. When the at least one inlet opening of the first one of the ducts is closed by corresponding closing element(s), such as a plate, for example, and when a blower unit is connected to the connector, an air flow from the connector through the first one of the ducts and through the outlet openings can be generated so that an air cushion is formed below the bearing face. In this way, the connection assembly in this embodiment is simple to design because the ducts, which are present in the first place, can be utilized to this end.

Furthermore preferably provided in the bearing face are second outlet openings which are connected to the second one of the ducts in such a manner that an air flow from the second one of the ducts through the second outlet openings connected to the latter can be generated. Furthermore provided is a second connector which is connected to the second one of the ducts, wherein the second connector is designed so as to be releasably connected to the outlet of a blower unit such that an air flow from the blower unit through the second connector and the second one of the ducts to the second outlet openings and out of the latter can be generated. Finally provided is a closing element(s) or mechanism for closing at least one inlet opening of the second one of the ducts. In this particularly preferred embodiment, the second one of the ducts is also utilized for generating an air flow through the second one of the ducts to the outlet openings in the bearing face, so that an air cushion can be generated on a further region of the bearing face.

In this case, the closing element(s) or mechanism for closing the at least one inlet opening of the first one of the ducts, and the closing element(s) or mechanism for closing the at least one inlet opening of the second one of the ducts, can be configured as plates. The connector is provided in a plate for closing the at least one inlet opening of the first one of the ducts, and the second connector is provided in a plate for closing the at least one inlet opening of the second one of the ducts. In this embodiment, each of the ducts is separately connected to one blower unit because each of the ducts has one connector. This permits greater flexibility, and two individual blower units which are less powerful but easier to carry can optionally be used. It is also possible for two powerful blower units to be used when particularly heavy loads have to be lifted.

As an alternative to the previously described preferred embodiment, the freight carrier can likewise have second outlet openings in the bearing face, the second outlet openings being connected to the second one of the ducts in such a manner that an air flow from the second one of the ducts through the second outlet openings connected to the latter can be generated so that the second one of the ducts is at least part of the connection assembly. The connector is connected to the second one of the ducts, and a closing element(s) or mechanism for closing the at least one inlet opening of the second one of the ducts is provided. It is likewise achieved in this embodiment that outlet openings are also provided in a second region of the bearing face, wherein a duct of the forklift truck receptacle is also used as a connection between the connector and the outlet openings for this region. In this instance, the advantage that both regions having outlet openings can be supplied by a single blower unit, without further elements such as lines being required to this end, is furthermore achieved. The closing element(s) or mechanism for closing the at least one inlet opening of the first one of the ducts, and the closing element(s) or mechanism for closing the at least one inlet opening of the second one of the ducts, can be configured as plates also in this embodiment.

In the context of the achievement of the above object according to the present aspect, the disclosure herein comprises a blower unit for connecting to a freight carrier according to the previously described aspect, the blower unit having an outlet and during operation being designed for generating an air flow at the outlet, wherein the outlet is designed so as to be able to be releasably connected to the connector of the base element of a freight carrier such that an air flow from the outlet into the connector and through the connection assembly to the outlet openings is generated during operation.

The blower unit according to the disclosure herein can be releasably connected to the connector on the base element of a freight carrier, preferably by way of coupling elements that can be releasably connected. Furthermore, the blower unit can be carried by a user, for example by way of a harness assembly, while an air flow is generated at the outlet, the airflow then being directed further onward through the connection assembly in the base element to the outlet openings so as to generate the air cushion. In this way, it is made possible for the air cushion to be generated and maintained on the freight carrier while the freight carrier is moved by a user. As a result, by the blower unit according to the disclosure herein, it is turn possible to proceed in the manner already described in the context of the freight carrier according to the disclosure herein in order to move the freight carrier into the cargo hold of an aircraft and out of the latter, without conveying installations being required in the cargo hold.

In one preferred design embodiment of this aspect, the outlet of the blower unit has a flexible hose. As a result, the position of the blower unit relative to the freight carrier can be adjusted to be most favorable for the user.

In the context of the achievement of the above object according to the present aspect, the disclosure herein moreover comprises a system having a freight carrier and a blower unit, wherein the freight carrier and the blower unit are in each case designed according to one of the possibilities which have already been described in the context of this aspect. The procedure already described for loading and unloading freight elements can be performed by the system according to the disclosure herein. In this way, it is also achieved by the system according to the disclosure herein and according to this aspect that it is not necessary to provide a cargo hold of an aircraft with complex and also heavy conveying installations in order for the cargo hold to be loaded and unloaded. Moreover, the additional element for receiving freight elements, specifically the freight carrier, is of a simple and lightweight design.

Finally, in the context of this aspect, the above object is achieved by a method for loading the cargo hold of an aircraft with a freight element, using the previously described system, the method comprising the following steps:

placing the freight element on the base area of the base element;

connecting the connector of the base element to the outlet of the blower unit and setting the blower unit in operation;

displacing the freight carrier along a floor area of the cargo hold; and disconnecting the outlet of the blower unit from the connector.

In the method according to this aspect, the procedure already described in the context of the freight carrier according to the disclosure herein is performed, wherein the advantages already explained are likewise achieved.

According to a further aspect of the disclosure herein, the above object is achieved by a freight carrier for accommodation in the cargo hold of an aircraft having a base element that has a bearing face which is designed in such a manner that the freight carrier can bear on a floor area of a cargo hold of an aircraft such that the bearing face lies opposite the floor area, wherein the freight carrier is designed to be moved across a floor area extending in a floor plane such that the bearing face faces the floor area, wherein the base element has a base area which is disposed on that side of the base element that faces away from the bearing face, wherein at least the bearing face is provided with sliding elements which enable the freight carrier to be displaced across the floor area.

A freight carrier constructed according to this aspect of the disclosure herein can likewise be moved through the cargo hold of an aircraft without a freight loading system being provided, because the sliding elements enable a displacement on the floor area of the cargo hold.

In one preferred embodiment, the sliding elements can be designed in such a way that a material pairing, i.e. the material of the sliding elements combined with the surface of the floor of the cargo hold on which the sliding elements slide, in which a minor coefficient of friction is present, is used.

It is furthermore advantageous for the sliding elements to be releasably mounted on the bearing face, thus being easily replaceable. In a particularly preferred embodiment, the sliding elements can comprise felt, polytetrafluoroethylene (PTFE; "Teflon") as a material.

It is furthermore possible that the floor of the cargo hold of the aircraft in those regions in which the freight carriers having the sliding elements are to be displaced is provided with strips of a material which, conjointly with the sliding elements, leads to a minor coefficient of friction. This moreover makes it possible that only the strips can be replaced when wear occurs on the strips by virtue of the friction between the latter and the sliding element, and wear does not occur on the floor per se.

It is furthermore preferable for the sliding elements in a circumference to project beyond the bearing face of the base element, the circumference been chosen such that, when the freight carrier is situated on the conveyor belt of a conveying installation, the sliding elements sink into the conveyor belt and the bearing face bears on the conveyor belt. In such a construction it is reliably prevented as a result of the contact between the conveyor belt and the bearing face over a large area that the freight carrier can shift in relation to the conveyor belt when the latter is obliquely positioned.

Moreover provided in the context of the achievement of the above object according to this aspect is also a system for loading a cargo hold of an aircraft with a freight element, wherein the system comprises:

a freight carrier for receiving the freight element, according to the previously described embodiments of this aspect, and a conveying installation for transporting the freight carrier, having a revolving conveyor belt onto which the freight carrier can be placed when transported and which is formed from an elastic material, wherein the conveyor belt can be disposed such that the latter extends from a loading region, adjacent to the apron on which the aircraft to be loaded and the conveying installation is situated, to a loading hatch of the aircraft, wherein the sliding elements of the freight carrier in a circumference project beyond the bearing face of the base element, the circumference being chosen such that, when the freight carrier is situated on the conveyor belt of the conveying installation, the sliding elements sink into the conveyor belt and the bearing face of the freight carrier bears on the conveyor belt.

As a result, the conveyor belt and the freight carrier are mutually adapted, and the sliding elements sink into the conveyor belt so far that the conveyor belt bears on that bearing face of the freight carrier that faces the conveyor belt. It is reliably prevented in this way that the freight carriers shift on the conveyor belt when the conveyor belt runs so as to be inclined from the apron to the loading hatch of the aircraft to be loaded. Furthermore, in a preferred embodiment of the freight carrier according to the previously described aspects, base mounting elements can be fastened to the base element in the peripheral region of the latter. This makes it possible that the freight carrier having mounting elements in the region of the floor area can be brought to engage by way of the base mounting elements in order to secure the base element in relation to unintentional displacement.

In a further preferred embodiment of the previously described aspects, a wall element, which is particularly preferably formed from a flexible planar material, on the side of the base area extends away from the base element and surrounds a receptacle space which extends away from the base area. In this case, a multiplicity of freight elements can be received on the freight carrier in that the freight elements are introduced into the receptacle space. This is a particularly advantageous design embodiment in particular for passenger baggage, in order for the items of baggage of dissimilar sizes to be mounted on the freight carriers. Moreover, the wall element simplifies the securing of the items of baggage in the cargo hold. This is because the wall element already reliably prevents the items of baggage moving away from the freight carrier and through the cargo hold during the flight.

When the wall element is of a flexible design, as in the particularly preferred embodiment already mentioned above, this enables the shape of the wall element to be able to adapt to the shape of the freight element received in the receptacle space. Moreover, when the freight carrier is not loaded with a freight element, the wall element can be collapsed and pressed onto the base area of the base element such that the space which a freight carrier assumes in this instance is as small as possible. This minimizes the stowage space which is required for freight carriers without a load.

However, it is also possible for the wall element to be formed from a rigid dimensionally stable, planar material. In an embodiment of this type, the cargo received in the receptacle space is better protected, and shifting of the cargo within the receptacle space does not lead to any deformation of the wall element and thus to a change in the shape of the entire freight carrier.

In the previously described aspects here it is further preferable for wall mounting elements to be provided on the peripheral region of the wall element that is remote from the base element. When the wall element extends away from the base element, the wall element has a periphery which is spaced apart from the base element and the base area of the latter by the wall element per se. In the preferred embodiment described, wall mounting elements are attached in the region of this periphery, and the wall mounting elements can likewise engage with mounting elements of the cargo hold when the freight carrier is accommodated in the cargo hold, so as to stabilize the wall element in the position extending away from the floor area, on the one hand, and so as to also secure the upper part of the freight carrier in relation to movements during the flight on the other hand. The securing of the load upon loading is particularly simplified as a result, because no additional securing elements have to be attached—only the wall mounting elements having to be connected to the mounting elements in the cargo hold.

In a preferred embodiment of the disclosure herein it is furthermore also possible for the freight carrier according to the disclosure herein to be designed to receive one or a plurality of wheelchairs. In particular, the area of the base area can be sized such that one or a plurality of wheelchairs can be received or placed thereon. To this end, the base area can also have correspondingly adapted fasteners such as straps for wheelchairs. The wall element of such a freight carrier can in particular be designed so as to be rigid and dimensionally stable so that wheelchairs received in the receptacle space of the freight carrier are not damaged. Moreover, it is advantageous in such a design embodiment for the freight carrier to have data transmission by way of which data pertaining to the content of the freight carrier, i.e. for example the number, the type or any information individually identifying the received wheelchairs, can be transmitted, preferably wirelessly, to a data network of an aircraft. In a design embodiment of the freight carrier for receiving wheelchairs it can furthermore be provided that expandable elements such as inflatable cushion elements by way of which the wheelchairs can be fixed in the receptacle space or protected against impact are provided on the wall element. If battery-operated wheelchairs are also to be received by the freight carrier, it can finally be advantageous to use heat-resistant and fire-resistant material for the wall element and the base element so that a fire in the cargo hold of the aircraft cannot occur in the event of great heat or fire being caused by the batteries.

In a further preferred embodiment of the previously described aspects of the freight carrier, the base element is configured as a rigid base plate. As a result, the freight carrier is highly stable and can thus be moved using transport structure of simple construction, because no support of the base plate across a large area is required by virtue of the rigid base plate.

In an alternative embodiment of the previously described aspect it is, however, also possible for the base element to have a multiplicity of segments configured so as to be mutually pivotable. In such a design embodiment, the freight carrier can be moved in a simple manner across uneven spots in the floor area across which the freight carrier is displaced. This is readily possible in particular when the pivot axes about which the segments are pivotable relative to another run so as to be mutually parallel.

Finally, in an alternative preferred embodiment of the previously described aspects it is possible for the base element to be configured as a flexible, in particular flexural, base plate. The freight carrier can be moved in a particularly simple manner across uneven surfaces also in this instance.

BRIEF DESCRIPTION OF THE DRAWINGS

The disclosure herein will be explained hereunder by a drawing showing only preferred example embodiments, in which.

DETAILED DESCRIPTION

Figure 1:
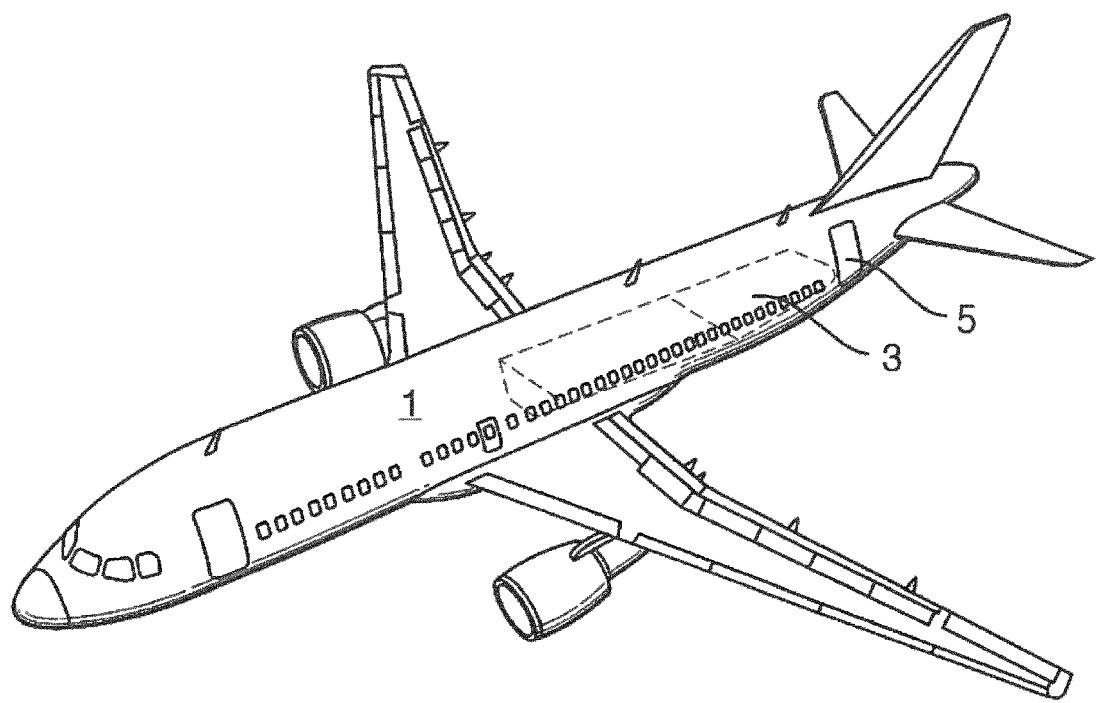
FIG. 1 shows a perspective view of a passenger aircraft, wherein the example embodiments of freight carriers according to the disclosure herein and a system according to the disclosure herein can be used for loading the cargo hold of the passenger aircraft.

Shown in FIG. 1 is an aircraft 1, the cargo hold 3 of the latter being able to be loaded through the loading hatch 5 with freight carriers 7 according to the example embodiments described hereunder by a conveyor belt which is not illustrated and extends between the apron on which the aircraft 1 is parked and the loading hatch 5. In particular, the cargo hold can be loaded with freight carriers 7 of the example embodiments described hereunder and using one of the systems according to the disclosure herein for loading cargo holds 3 of aircraft 1 with freight elements.

Figure 2:
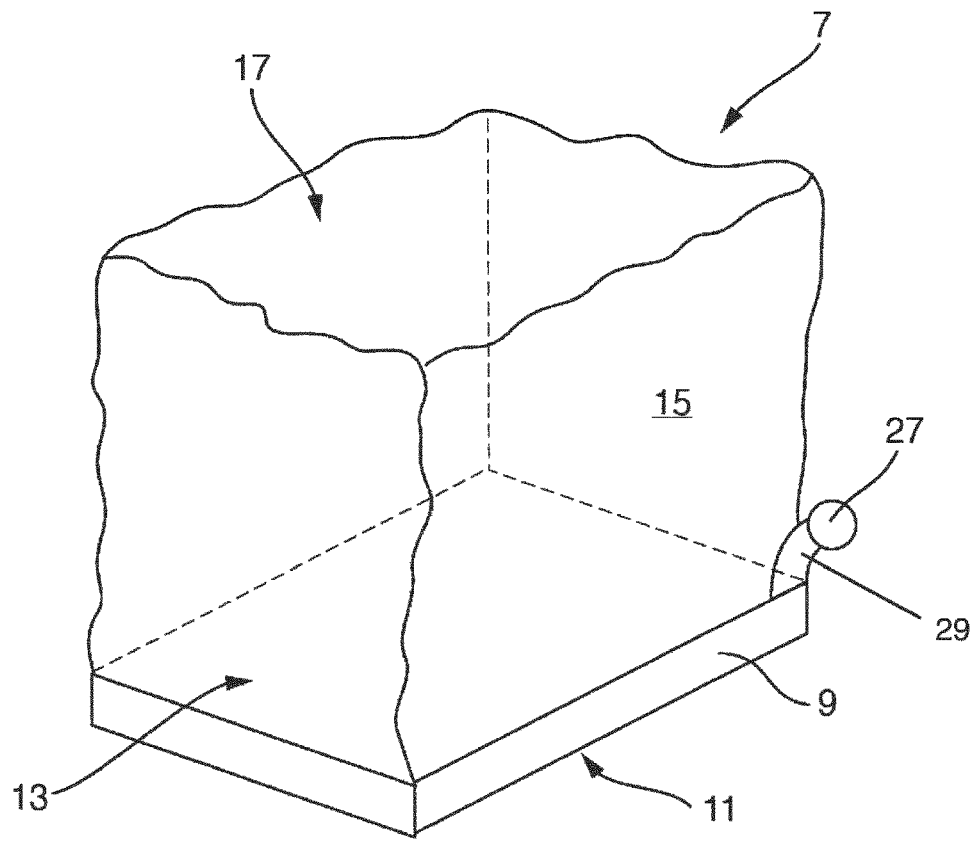
FIG. 2 shows a perspective view of a freight carrier of a first example embodiment, in particular for a system according to the disclosure herein.

As can be seen in FIG. 2, the freight carrier 7 of the first example embodiment has a presently rectangular base element 9 which in turn in the present example embodiment has a flat bearing face 11. The latter is designed so as to bear on a floor area of the cargo hold 3 of the aircraft 1 in such a manner that the bearing face 11 can be displaced along the floor area when the bearing face 11, by virtue of an air cushion configured between the latter and the floor area, is slightly spaced apart from the floor area. The base element 9 on that side thereof that faces away from the bearing face 11 is provided with a base area 13 of the likewise flat design, on which a freight element can be received. While the base area 13 here is illustrated as being flat, the disclosure herein is not limited to flat base areas 13 of this type, but the base area 13 can be configured so as to be curved. However, the base area 13 according to the disclosure herein is designed such that freight elements can be received on the base area 13. It is in particular conceivable that the base area 13 is adapted to a specific type of freight elements.

As can furthermore be seen in FIG. 2, the freight carrier 7 of the first example embodiment has an encircling wall element 15 which extends upward, away from the base area 13. The wall element 15 in the example embodiments described here is formed from a flexible, planar material and can therefore be collapsed and pressed onto the base area 13 such that the freight carriers 7 in this instance occupy a comparatively minor volume and can be stored in a space-saving manner when the freight carriers 7 are not in use.

Because the wall element 15 encircles the edge of the rectangular base element 9, the wall element 15 delimits a receptacle space 17 which extends upward, away from the base area 13, and in which one or a plurality of freight elements (not illustrated) can be received in that the latter are at least in part placed on the base area 13. The freight elements can in particular be passenger baggage of the aircraft 1. However, the disclosure herein is not in any way limited thereto, so that the term "freight element" in the context of the disclosure herein comprises any type of freight which can be transported in an aircraft.

It is furthermore to be pointed out that it is also possible in the context of the disclosure herein that the wall element 15 is dispensed with, or that the latter is formed from a rigid or stiff material. The former can be particularly advantageous when only one or a few freight elements are to be received on the freight carrier. A wall of a rigid or stiff material is associated with the advantage that the freight elements are securely held in the interior of the receptacle space 17, and the dimensions of the latter are fixedly predefined.

Figure 3:
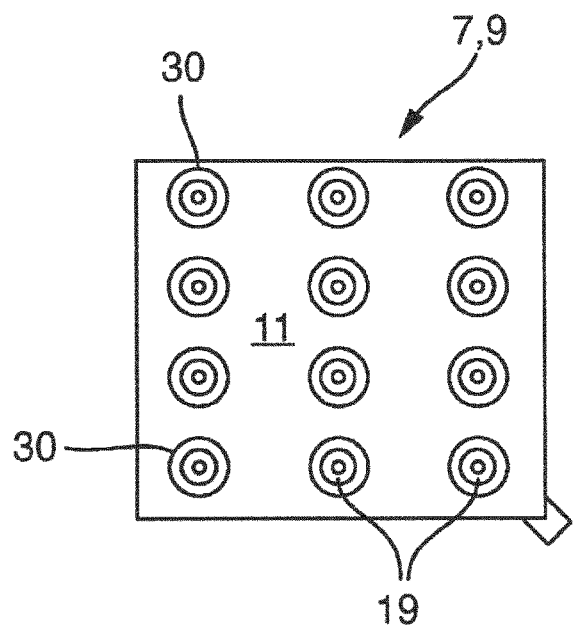
FIG. 3 shows a view of the bearing face of the freight carrier from FIG. 2.

As is furthermore shown in the plan view of the bearing face 11 of the freight carrier 7 from FIG. 3, clearances 19 which have a base 21 that runs in a plane spaced apart from the plane of the bearing face 11 are configured in the bearing face 11. This is not illustrated in detail for the freight carrier 7 of the first example embodiment. However, this construction corresponds to that of the second example embodiment, and the clearances 19 can be seen in the cross-sectional view according to FIG. 5. The base 21 of the clearances 19 is thus recessed in relation to the bearing face 11, so as to be set back toward the base area 13.

In the example embodiments of freight carriers 7 described here, which are shown in FIGS. 1 to 12, one outlet opening 23 through which an air flow can exit and thus initially flow into the clearance 19 is provided in the base 21 of each of the clearances 19. The outlet openings 23 of both example embodiments are connected to a connector 27 by way of a connection assembly, not identifiable in FIG. 3 but shown in FIG. 5, in the form of a line assembly 25 composed of individual line portions, the line assembly 25 and thus finally also the outlet openings 23 being able to be impinged with an air flow by way of the connector 27. While the connection assembly which fluidically connects the outlet openings 23 and the connector 27 is presently configured as a line assembly 25 having line portions, it is likewise possible for the base element 9 to be provided with a cavity which is fluidically connected to the outlet openings 23 as well as to the connector 27.

As is shown in FIGS. 2 and 3, the freight carrier 7 in the first example embodiment is designed in such a manner that the connector 27 is spaced apart from the base element 9, and a line element 29 which extends from the base element 9 to the connector 27 is provided. The line element 29 can be configured as a flexible hose and connects the connector 27 to the line assembly 25 provided in the base element 9.

The connector 27 is configured such that the connector 27 can be releasably connected to the outlet of a blower unit, the latter yet to be described hereunder. To this end, the connector 27 can have a coupling element which is designed to be releasably connected to a coupling element at the outlet of the blower unit. The coupling elements at the connector 27 and at the outlet of the blower unit may configured as a simple plug connection or a bayonet connection. Many possibilities are conceivable to this end. However, it is important that a user is able to fluidically connect and disconnect the connector 27 and the outlet of the blower unit in a simple manner.

Figure 5:
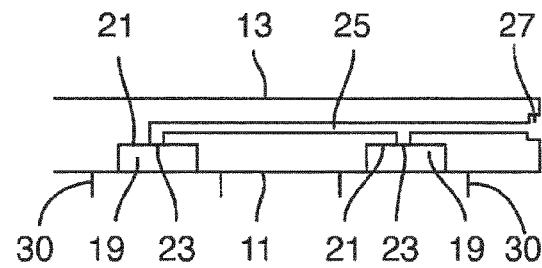
FIG. 5 shows a sectional illustration of the base element of the freight carrier from FIG. 4.
Figure 4:
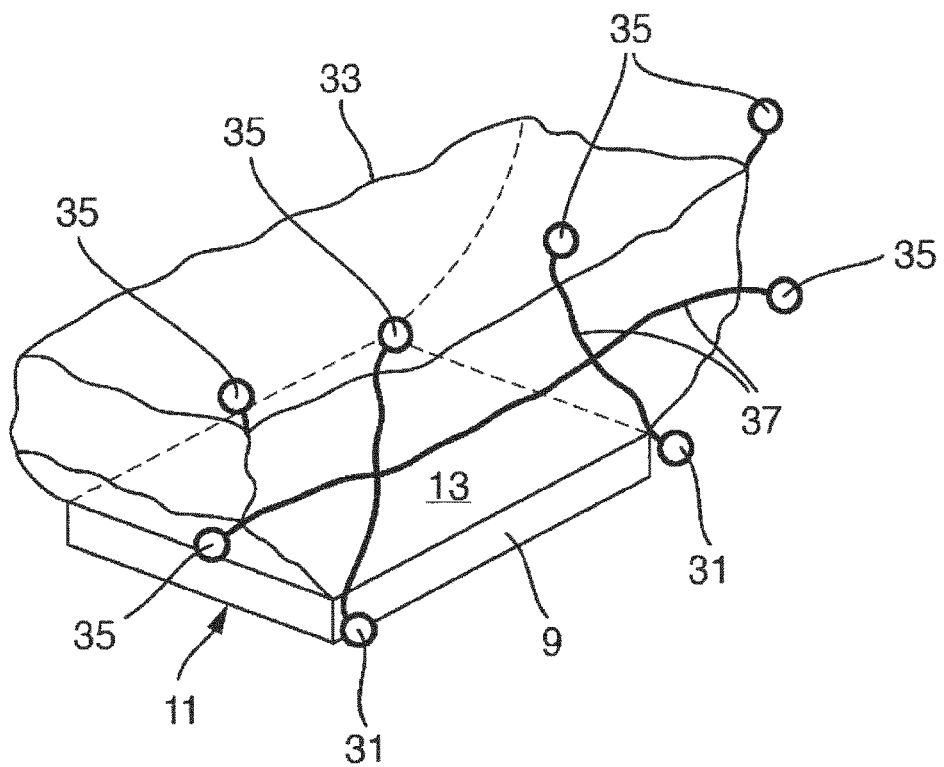
FIG. 4 shows a perspective illustration of a freight carrier of a second example embodiment, in particular for a system according to the disclosure herein.

The second example embodiment of a freight carrier 7 according to the disclosure herein illustrated in FIGS. 4 and 5, in particular for a system according to the disclosure herein for loading a cargo hold with at least one freight element, differs from the freight carrier 7 shown in FIGS. 2 and 3 in that the connector 27 in the second embodiment is provided in the base element 9 and is not spaced apart from the latter by a line element, for example. As is shown in FIG. 5, the connector 27 in the second example embodiment is configured as a plug socket into which the outlet of the blower unit can be inserted.

It can furthermore be derived from FIGS. 3 and 5 that the bearing face 11 about the individual outlet openings 23, or clearances 19 in which the outlet openings 23 are disposed, is provided with individual encircling sealing elements 30 such that each of the clearances 19 is surrounded by one sealing element 30. It is achieved as a result that an air cushion which is formed below the bearing face 11 by air exiting the outlet openings 23 is maintained. Alternatively, it is also possible for the external periphery of the bearing face 11 to be provided with an individual encircling sealing element, the external periphery enclosing the region in which the outlet openings 23 are disposed.

As can furthermore be seen from FIG. 4, as opposed to the first example embodiment, base mounting elements 31 in the form of eyelets are provided in the peripheral region of the base element 9 and fastened to the base element 9 in the second example embodiment.

While eyelets are illustrated here, other elements instead of the eyelets can be used as base mounting elements. Furthermore, wall mounting elements 35 are fastened in the region of the wall element 15, on the encircling edge 33 remote from the base area 13 and the base element 9, on the one hand. Further wall mounting elements 35 are fastened to the wall element 15 between the upper encircling edge 33 and the base element 9, or the base area 13, respectively. As can furthermore be seen in FIG. 4, the wall mounting elements 35 and the base mounting elements 31 are likewise connected to one another by way of connection elements 37 so that the connection between the base mounting elements 31 and the wall mounting elements 35 is further stabilized.

Figure 10:
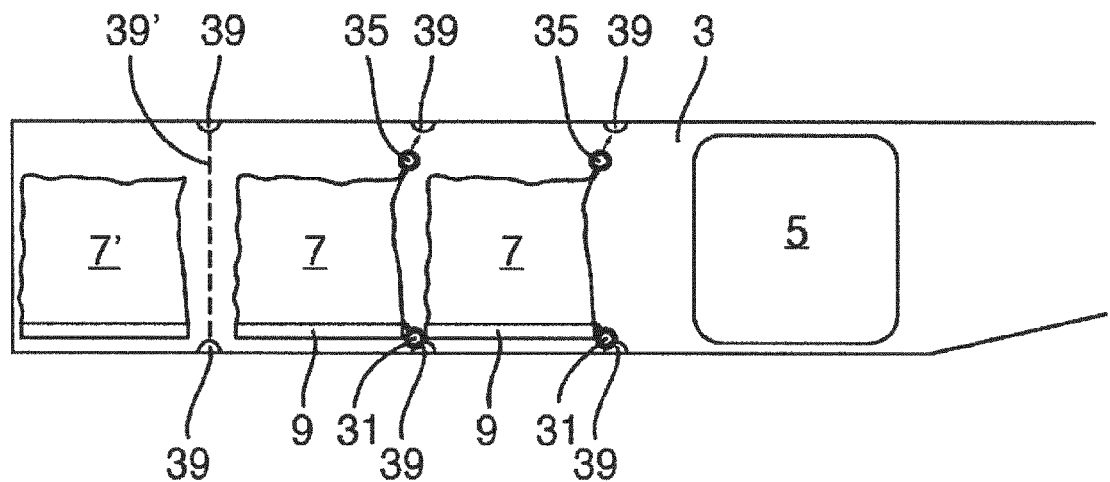
FIG. 10 shows a schematic longitudinal sectional illustration through the cargo hold of an aircraft, having freight carriers from FIG. 4 accommodated therein.

By the base mounting elements 31 and wall mounting elements 35 fastened directly to the base element 9 and the wall element 15, freight carriers 7 of the second example embodiment can be fastened in a simple manner in the cargo hold 3 of an aircraft 1 to mounting elements 39 provided therein. This is illustrated in FIG. 10 in which the arrangement of two freight carriers 7 of the second example embodiment together with a conventional freight carrier 7' is illustrated. It can be seen here that the base mounting elements 31 and wall mounting elements 35 in the freight carriers 7 of the second example embodiment engage with mounting elements 39 which are provided in the cargo hold 3 of the aircraft 1. As opposed thereto, in the case of conventional freight carriers 7' it is necessary for the latter to be secured by a separate mounting element 39'. The securing of the freight in the cargo hold 3 is thus additionally simplified by providing the base mounting elements 31 and wall mounting elements 35 on the freight carrier 7, as a separate mounting element is no longer required.

Figure 6:
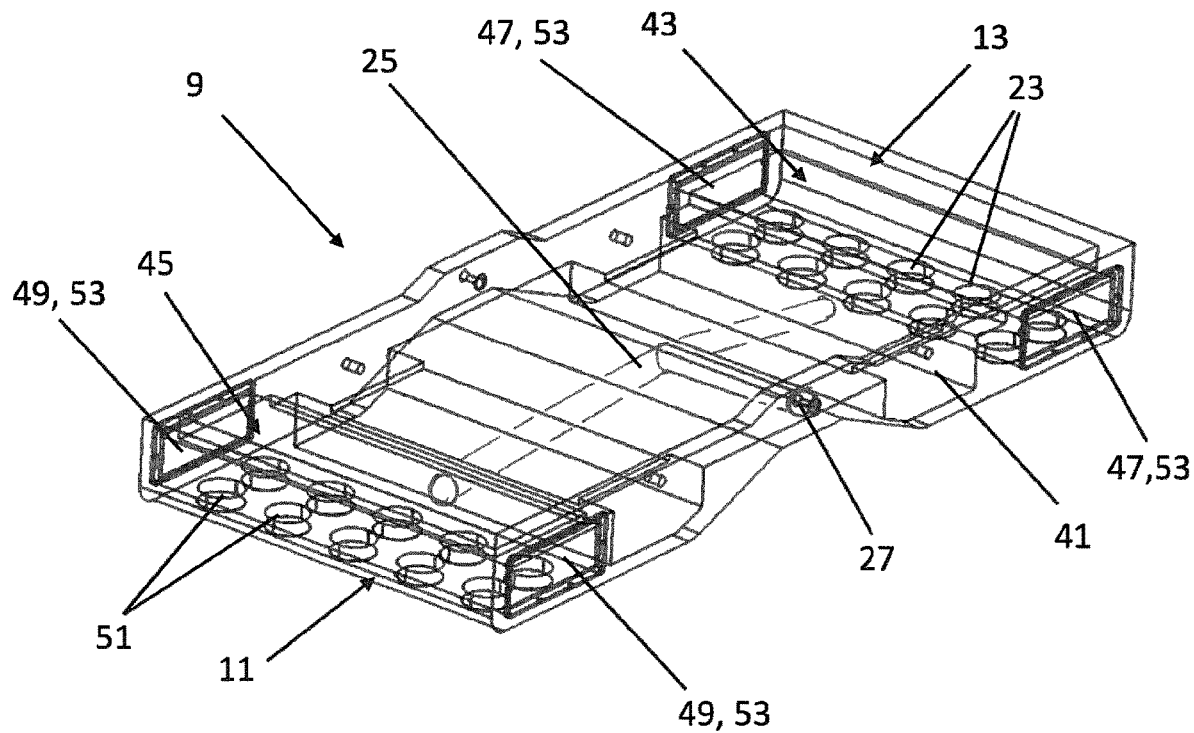
FIG. 6 shows a perspective illustration of the base element of a freight carrier according to a third example embodiment.
Figure 7:
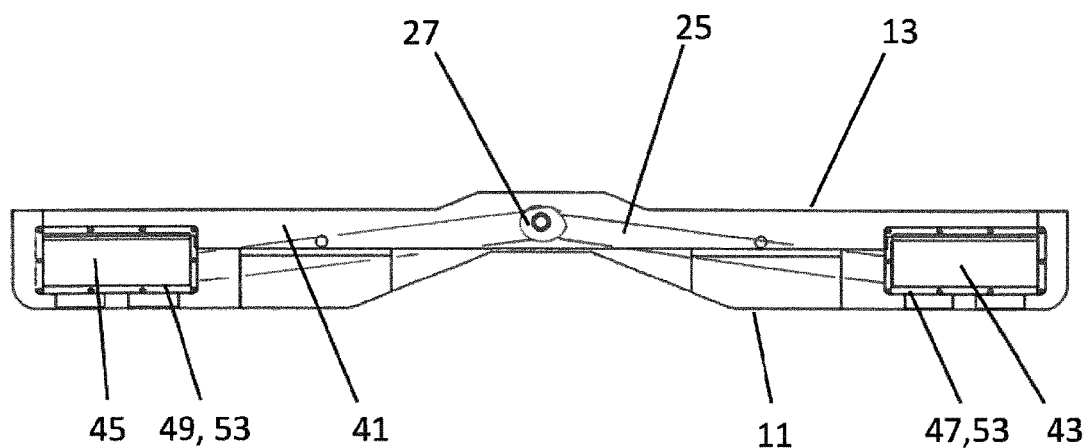
FIG. 7 shows a lateral view of the base element from FIG. 6.

The base element 9 of a third example embodiment of a freight carrier 7, which can be used in an embodiment of a system according to the disclosure herein, is shown in FIGS. 6 and 7.

In this third example embodiment, the base element 9, besides the bearing face 11 and the base area 13 from which the receptacle space extends, has a lateral face 41 which extends from the bearing face 11 to the base area 13 and encircles the base element 9. In the example embodiment described here, the lateral face 41 runs perpendicularly to the bearing face 11.

A first duct 43 and a second duct 45 emanate from the lateral face 41, the first duct 43 and the second duct 45 extending so as to be mutually parallel and parallel to the bearing face 11. In this example embodiment, each of the ducts 43, 45 here on both ends has an inlet opening 47, 49 in the lateral face 41. The ducts 43, 45 are designed and sized such that the fork of a forklift truck can be received in the ducts 43, 45. This means that the cross section of the ducts 43, 45 is chosen such, and the spacing between the ducts 43, 45 is sized such, that the fork of a forklift truck can be inserted into the ducts 43, 45. As a result, the freight carrier 7 of this example embodiment can also be transported in a simple manner by a forklift truck.

In this preferred embodiment, the outlet openings 23 are furthermore connected to the first duct 43. Moreover, second outlet openings 51 are provided in the region of the second duct 45 in the bearing face 11, the second outlet openings 51 being connected to the second duct 45. Finally provided here is also a line assembly 25 by which the first duct 43 as well as the second duct 45 are connected to the connector 27 on the base element 9. In this way it is possible that an air flow from the connector 27 through the line assembly 25, through the first duct 43 through the outlet openings 23, and through the second duct 45 through the second outlet openings 51 connected to the latter, can be generated in this example embodiment. The first duct 43 as well as the second duct 45 are thus part of the connection assembly.

Finally provided are closing element(s) in the form of plates 53 which are releasably attached and by way of which the inlet openings 47, 49 of the first duct 43 and of the second duct 45 can be closed. When an air cushion is to be generated below the freight carrier 7, or below the base element 9, respectively, the plates 53 have to be attached. However, if the freight carrier is to be conveyed using a forklift truck, it is necessary for the plates 53 to be removed.

It is achieved in this embodiment that outlet openings 23, 51 are provided in two regions of the bearing face 11, specifically in each case adjacent to the ducts 43, 45, wherein the ducts 43, 45 of the forklift truck receptacle are used as a connection to the connector 27 in order for these regions to be supplied with air. The advantage that both regions having outlet openings 23, 51 can be supplied by a single blower unit, without further elements such as lines being required to this end, is furthermore achieved.

Figure 8:
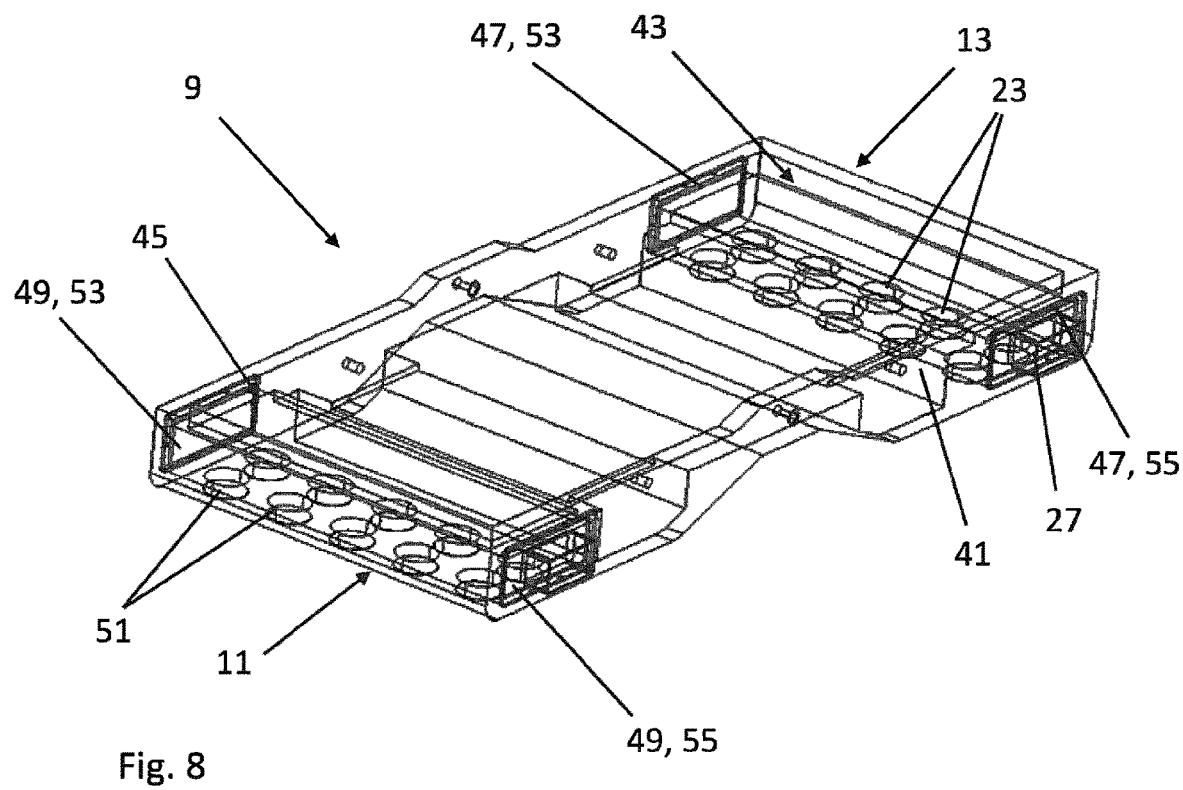
FIG. 8 shows a perspective illustration of the base element of a freight carrier according to a fourth example embodiment.
Figure 9:
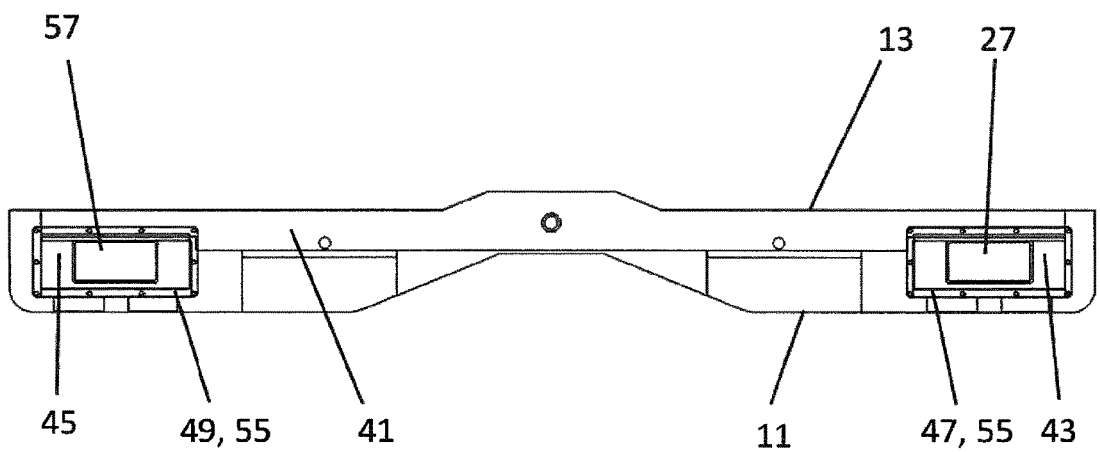
FIG. 9 shows a lateral view of the base element from FIG. 8.

A base element 9 of a fourth example embodiment of a freight carrier 7, as an alternative to the third example embodiment, is shown in FIGS. 8 and 9.

In this example embodiment, as in the case of the third example embodiment, a first duct 43 and a second duct 45 which are designed for receiving a fork of a forklift truck are also provided. The ducts 43, 45 are designed in the same way as has already been described in the context of the third example embodiment, and the outlet openings 23 are connected to the first duct 43, and the second outlet openings 51 are connected to the second duct 45, also here. The ducts 43, 45 thus are part of the connection assembly by way of which the outlet openings 23 and the second outlet openings 51 are connected to a connector in the manner yet to be described.

As opposed to the third example embodiment, no line assembly is provided in the case of the fourth example embodiment. Rather, the first duct 43 at an inlet opening 47 in the fourth example embodiment is releasably closed by a plate 53 when an air cushion is to be generated below the base element 9, while a connector plate 55 is releasably attached to the other inlet opening 47 of the first duct 43. The connector plate 55 at the inlet opening 47 of the first duct 43 has the connector 27 which can be connected to a blower unit. In the same way, an inlet opening 49 of the second duct 45 is releasably closed by a plate 53, while a connector plate 55 which has a second connector 57 to which a blower unit can likewise be connected is likewise attached to the other inlet opening 49 of the second duct 45.

In this fourth example embodiment, each of the ducts 43, 45 can be separately connected to a blower unit, because each of the ducts 43, 45 has one connector 27, 57. This permits greater flexibility, and two individual blower units which are less powerful but easier to carry can optionally be used. It is likewise possible for two powerful blower units to be used when particularly heavy loads have to be lifted. In a manner similar to the example embodiments shown in FIGS. 2 to 9 and described with reference thereto, the freight carriers 7, of which the base elements 9 are shown in FIG. 6 to, can have a wall element 15 which is formed from a flexible or a rigid and dimensionally stable material. The wall element 15, as in the previously described example embodiments, can also extend away from the base element 9 on the side of the base area 13, and thus surround a receptacle space 17 for the cargo that likewise extends away from the base area 13, wherein the cargo bears on the base area 13. Wall mounting elements 35 can be provided on the wall element 15, on the peripheral region of the wall element 15 remote from the base element 9, the freight carrier 7 by way of the wall mounting elements 35 being able to be connected to connection elements 37 provided in the cargo hold of the aircraft so as to secure the freight carrier 7 in the cargo hold. Moreover, as has already been described in the context of FIG. 4, base mounting elements 31 in the form of eyelets can be provided in the peripheral region of the base element 9 and fastened to the base element 9.

Figure 11:
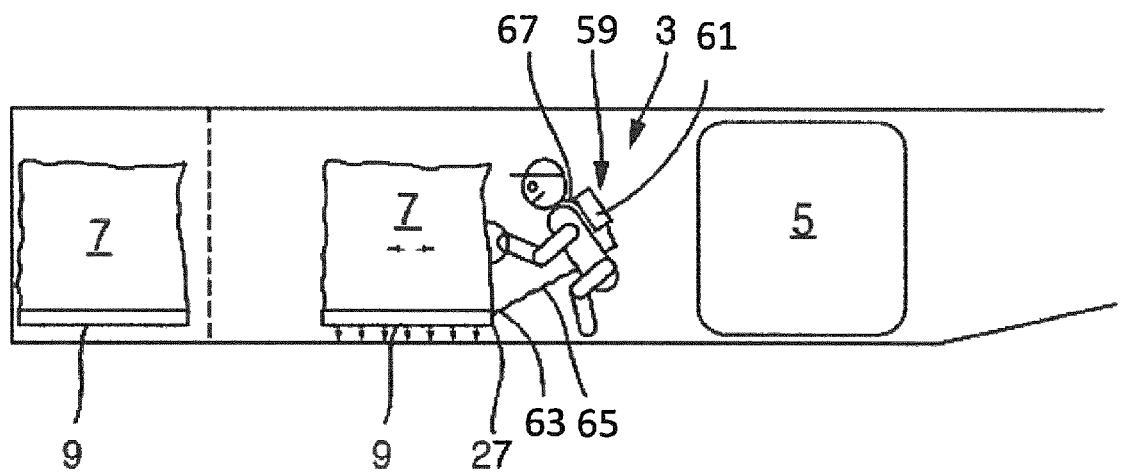
FIG. 11 shows a schematic illustration of loading of the cargo hold of an aircraft, using the example embodiments of a system according to the disclosure herein.

Moreover provided in a system according to the disclosure herein for loading a cargo hold of an aircraft with at least one freight element is a blower unit 59 for the first to fourth example embodiments of freight carriers 7 according to the disclosure herein. This blower unit 59 is schematically shown in FIG. 11 and has a blower 61 as well as an outlet 63. The outlet 63 has a flexible hose 65 which extends away from the blower 61 and can be releasably connected to the connector 27 of the base element 9 of the freight carrier 7 of the first to fourth example embodiments. Moreover provided on the blower unit 59 in the example embodiments here is a harness assembly 67 so that a user can carry the blower unit 59 on his/her back.

In the operation of the blower unit 59, when the blower 61 is in operation, the latter generates an air flow at the outlet 63. Because the outlet 63 is designed to be releasably connected to the connector 27 of the freight carrier 7, an air flow from the outlet 63 into the connector 27 and through the line assembly 25 to the outlet openings 23 can be generated when the freight carrier 7 and the blower unit 59 are connected to one another. When such an air flow is generated with the aid of the blower unit 59, an air cushion which slightly lifts the freight carrier is generated below the bearing face 11 of the freight carrier 7 according to the first to fourth example embodiments, such that the freight carrier in this instance can be pushed by hand across the floor area of the cargo hold 3 or other areas. As a result, the following procedure can be performed in order to load one or a plurality of freight elements into the cargo hold 5 of an aircraft:

At least one freight element is initially placed on the base area 13 of the freight carrier 7 according to the first and the second example embodiments, the freight carrier 7 initially being situated outside the cargo hold. In particular, a multiplicity of freight elements can be placed, optionally also stacked on top of one another, in the receptacle space 17 on the base area 13, the receptacle space 17 being delimited by the wall element 15.

The outlet 63 of the blower unit 59 is connected to the connector 27 on the base element 9 of the freight carrier 7 even before, or at the latest after, the freight element or elements have been placed on the base area 13. Because the blower unit 59 has a flexible hose on the outlet 63, the blower unit 59 can be disposed at a position relative to the base element 9 that is ideal for the blower unit 59 to be carried by the user.

Once the freight element or elements has/have been placed in the receptacle space 17, the blower unit 59 is set in operation. In turn, an air flow which runs from the blower 61 of the blower unit 59 through the outlet 63 of the latter into the connector 27 of the base element 9, and from there onward through the line assembly 25 to the outlet openings 23, is generated as a result.

As a result of this air flow, an air cushion is formed below the bearing face 11 of the freight carrier 7, this making it possible for the freight carrier 7 having the freight element or elements to be displaced manually without any great resistance. In this way, the freight carrier 7 according to the first to the fourth example embodiments in this instance can be displaced across transport planes into the cargo hold 3 and from there onward across the floor area of the latter to the desired final position by a user who in the preferred embodiment described here carries the blower unit 59 on his/her back.

Once the final position in the cargo hold 3 has been reached, the connector 27 on the base element 9 and the outlet 63 of the blower unit 59 are disconnected from one another and/or the blower unit 59 is switched off so that the air cushion collapses and the freight carrier 7 stands firmly on the floor area of the cargo hold 3. In the freight carriers 7 from the second example embodiment, the base mounting elements 31 and the wall mounting elements 35 can now be brought to engage with mounting elements 39 in the cargo hold 3 so as to further fix the freight carriers 7.

The user now can displace further freight carriers 7 according to the first to the fourth example embodiments into the cargo hold 3 in the manner already described, wherein the user connects the outlet 63 of the blower unit 59 to the connector 27 of the freight carrier 7 to be currently displaced.

The procedure is performed in the reverse order in order for the cargo hold 3 to be unloaded, i.e. the blower unit 59 is connected to the connector 27 of the freight carrier 3 to be conveyed out of the cargo hold 3, and an air cushion is built up between the bearing face 11 of the freight carrier 7 and the floor area of the cargo hold 3 once the blower unit 59 has been set in operation. The freight carrier 7 then can be easily pushed by hand across the floor area to the loading hatch 5 of the cargo hold 3, and from there be pulled out of the aircraft 1 across a transport plane.

Figure 12:
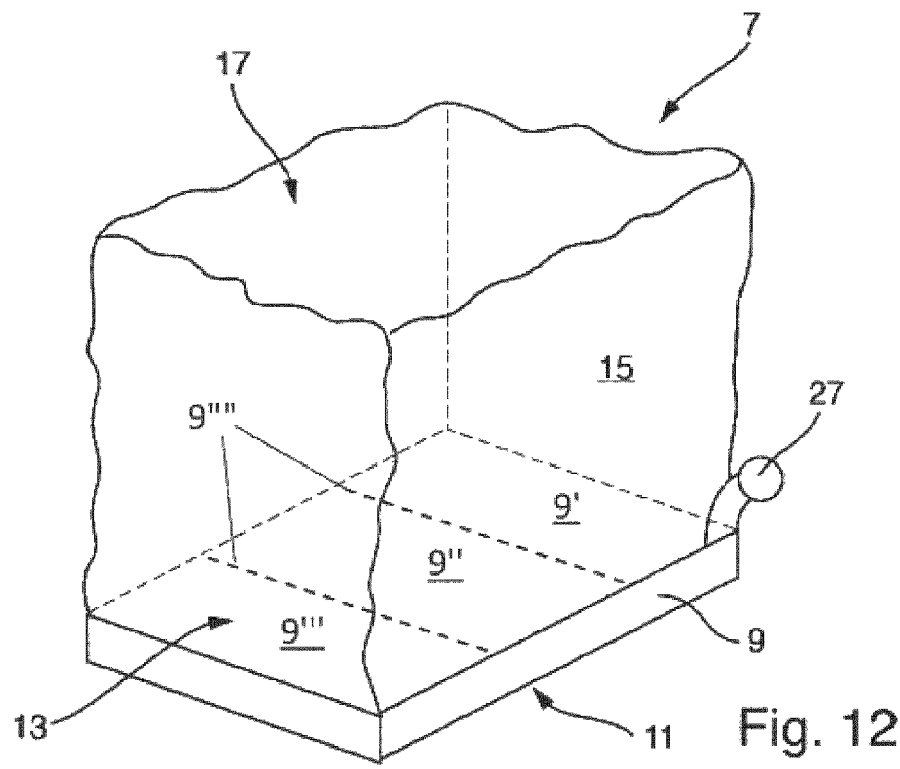
FIG. 12 shows a perspective view of a variant of the freight carriers according to the preceding example embodiments, in particular for a system according to the disclosure herein.

A variant of the freight carriers 7 according to the first and the second example embodiment is schematically illustrated in FIG. 12. It can be seen here that the base element 9 in this variant has segments 9', 9", 9''' which along the joints 9'''' are pivotably connected to one another between the segments. The joints 9'''', and thus the pivot axes about which the segments 9', 9", 9''' can pivot relative to one another, are mutually parallel in the example embodiment shown here. A variant of this type of the freight carrier 7 having a segmented base element 9 can be moved in a simple manner across an uneven floor area. It is also conceivable here that the pivot axes about which the segments can pivot relative to one another do not run so as to be mutually parallel.

Moreover, in the first and the second example embodiment of a freight carrier 7, it is also possible for the base element 9 to be formed from a flexible, in particular flexural, material such that the freight carrier 7 can be bent and thus adapt to uneven spots in the floor area.

Figure 13A:
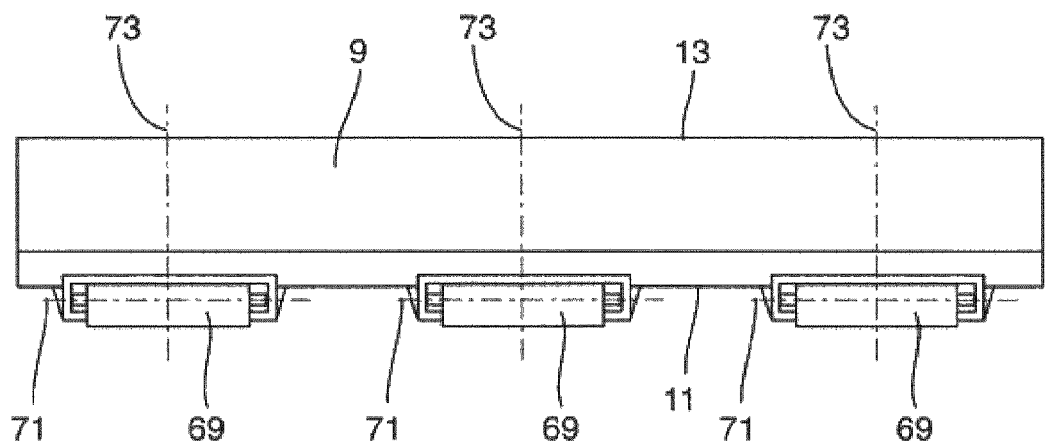
FIGS. 13a and 13b show cross-sectional views of the base element of a freight carrier of a further example embodiment.
Figure 13B:
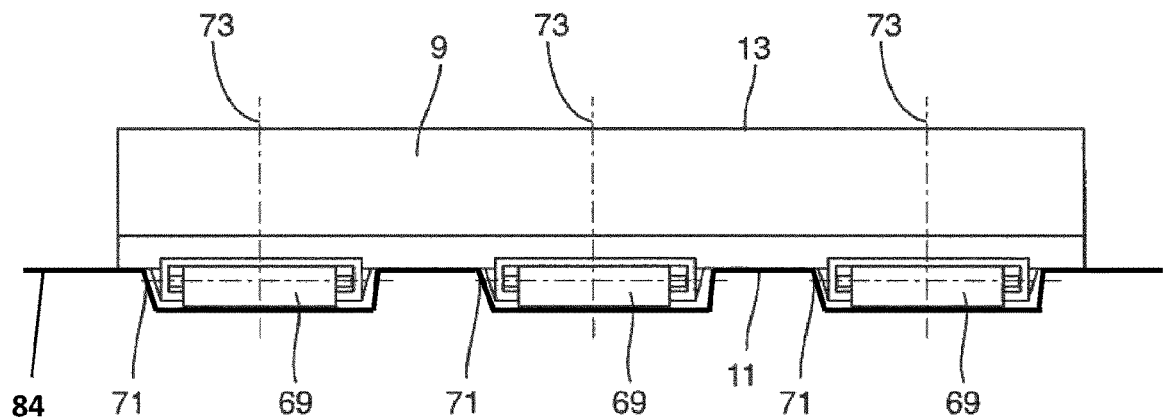

FIGS. 13*a* and 13*b* show a cross-sectional view of the base element 9 of a further example embodiment of a freight carrier 7. The base element 9 also in this example embodiment has a bearing face 11 which here is likewise designed in such a manner that the freight carrier 7 can bear on a floor area of a cargo hold of an aircraft 1 such that the bearing face 11 lies opposite the floor area. In this example embodiment the bearing face 11 is thus also that face of the base element 9 that faces the floor area on which the freight carrier 7 having the base element 9 can be displaced. Moreover, the base element 9 has a base area 13 which is disposed on that side of the base element 9 that faces away from the bearing face 11, so that the base area 13 lies opposite the bearing face 11 and serves for receiving cargo.

In a manner similar to the example embodiments shown in FIGS. 2 to 12 and described with reference thereto, the freight carrier 7, the base element 9 of the latter being shown in the cross section in FIGS. 13*a* and 13*b*, can also have a wall element 15 which is formed from a flexible or rigid and dimensionally stable material. As in the previously described example embodiments, the wall element 15 can also extend away from the base element 9 on the side of the base area 13, and thus surround a receptacle space 17 for the cargo that likewise extends away from the base area 13, wherein the cargo bears on the base area 13. Wall mounting elements 35 can be provided on the wall element 15 on the peripheral region of the wall element 15 remote from the base element 9, the freight carrier 7 being able to be connected to connection elements 37 provided in the cargo hold of the aircraft by way of the wall mounting elements 35, so as to secure the freight carrier 7 in the cargo hold. Moreover, as has already been described in the context of FIG. 4, base mounting elements 31 in the form of eyelets can be provided in the peripheral region of the base element 9 and fastened to the base element 9.

Figures 14A, 14B:
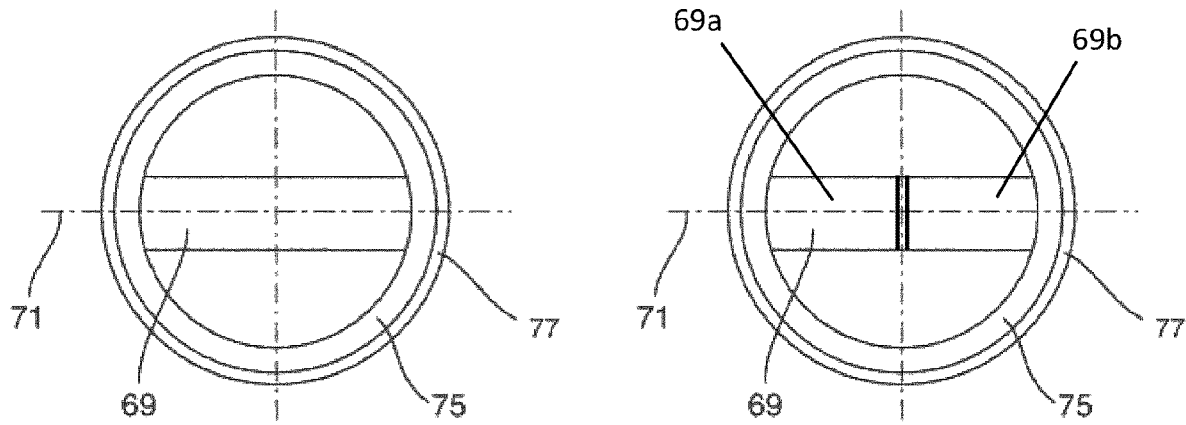
FIGS. 14a and 14b show plan views of a portion of the bearing face of the base element of the example embodiment from FIGS. 13a and 13b, wherein different embodiments of the rolling elements are illustrated.
Figure 15:
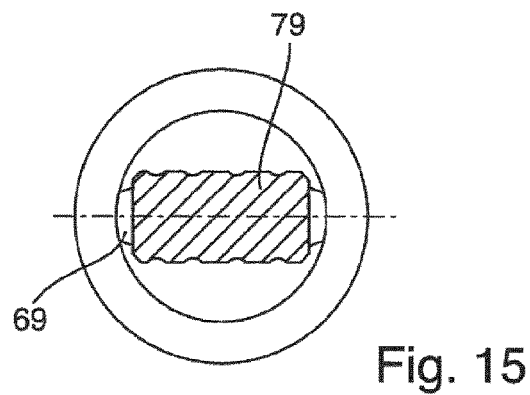
FIG. 15 shows a plan view of a portion of the bearing face, having an alternative to the rolling elements of the example embodiment from FIGS. 13a and 13b.

In the example embodiments of a freight carrier 7 shown in FIGS. 13 to 15, the bearing face 11 has a multiplicity of rolling elements which in these preferred example embodiments are configured as cylindrical rollers 69. Each of the rollers 69 is initially rotatable about a rotation axis 71 in relation to the base element 9, wherein this rotation axis 71 is aligned in such a manner that the latter runs parallel to an axis that, in a contact point in which the roller 69 bears on the floor area on which the freight carrier 7 bears, extends parallel to the floor area. In the event that the floor area in the region in which the freight carrier 7 bears thereon is flat and not curved, the rotation axis 71 runs parallel to the plane of the floor area and thus the floor plane of the floor area.

Furthermore, the rollers 69 are mounted on the base element 9 in such a manner that the rotation axis 71 of each of the rollers 69 can rotate about a vertical axis 73, wherein the vertical axis 73 extends parallel to an axis that, in the contact point between the roller 69 and the floor area, runs perpendicularly to the floor area. In the case of the rollers 69, the vertical axis 73 always runs perpendicularly to the rotation axis 71 of the roller 69 and moreover perpendicularly to the plane of the floor area in which the latter extends in the region in which the freight element 7 bears on the floor area.

In the example embodiments shown in FIGS. 13*a*, 13*b*, 14, 14*b* and 15, the rotatability of the rollers 69 about the vertical axis 73 is implemented in such a way that the rollers 69, as is shown in FIGS. 14*a* and 14*b*, are mounted in a mount 75 so as to be rotatable about the rotation axis 71. This mount 75 in turn is received rotatably about the vertical axis 73 in a receptacle 77 which is fixedly connected to the base element 9. However, other design embodiments of the mounting of the rollers are also conceivable.

As a result of the rotatably of the rollers 69 about the vertical axis 73, it is achieved that the freight carrier 7 can be pushed across the floor area of a cargo hold 3 of an aircraft 1 in arbitrary directions, and thus can also be positioned at a desired location, without the freight carrier 7 putting up any great resistance counter to such a movement. The rotatability of the rollers 69 about the vertical axis 73 makes it possible that the rollers 69 are rapidly aligned in the desired manner.

In the example embodiment shown in FIG. 14*a*, the rollers 69 are configured as integral or single-part cylindrical rollers which are rotatable about the rotation axis 71. As is illustrated in FIG. 14*b*, it is however also possible that the rollers 69 have mutually separate roller portions 69*a*, 69*b*, wherein the roller portions 69*a*, 69*b* are mounted in the mount 75 so as to be rotatable in a mutually independent manner about the rotation axis 71. The vertical axis 73 about which the mount 75 is rotatable here runs in the separation plane between the roller portions 69*a*, 69*b*. In such a construction having rollers 69 which have mutually separate, independently rotatable roller portions 69*a*, 69*b*, the roller portions 69*a*, 69*b* can in particular rotate in opposite directions. This has the advantage that the rollers 69, when the freight carrier 7 is pushed in a predefined direction, by rotating the mount 75 are particularly easily aligned such that the rotation axis 71 of the rollers 69 is aligned so as to be perpendicular to the predefined direction of movement of the freight carrier 7. Therefore, the freight carrier 7 in this instance can easily be displaced on the floor area of a cargo hold 3.

In this context it has also been proven to be advantageous for the rollers 69 to have at least one helically encircling groove 79 in the external face, as is shown as a preferred embodiment of the rollers 69 in FIG. 15. In such a design embodiment, the rollers 69 are likewise very rapidly aligned by a pivoting movement about the vertical axis 73 such that the rotation axis 71 runs perpendicularly to the direction of movement of the freight carrier and the rollers 69 put up an ideally minor resistance counter to such a movement.

The base element 9 can also be configured as a rigid base plate in the example embodiment described with reference to FIGS. 13 to 15. However, it is also possible for the base element 9 to have a multiplicity of segments configured so as to be mutually pivotable, wherein the pivot axes about which the segments are pivotable relative to one another can run so as to be mutually parallel.

A freight carrier 7 equipped with rollers 69, as is shown in the example embodiment from FIGS. 13 to 15, can thus be easily moved along the floor area of a cargo hold without a freight loading system being required to this end or the freight carrier 7 being of a complicated design. Moreover, it is also conceivable that the base element 9 is configured as a flexible, in particular flexural, base plate.

The further example embodiment of a freight carrier 7, the base element 9 of the latter being shown in the cross section in FIG. 9, can be configured like the example embodiment described with reference to FIGS. 13 to 15, i.e. the base element 9 can likewise be configured as a rigid or flexible base plate, or can have a multiplicity of segments which are connected to one another so as to be pivotable along pivot axes which are preferably mutually parallel. Moreover, a wall element 15 which on the side of the base area 13 extends away from the base element 9 and surrounds a receptacle space for receiving cargo can be provided on the base element 9. The wall element 15 can be produced from a flexible planar material, as has already been described, and can furthermore have wall mounting elements 35 for fixing the freight carrier 7 in a cargo hold. However, it is also possible for the planar material of the wall element 15 to be configured so as to be rigid and dimensionally stable. Finally, as has already been described in the context of FIG. 4, base mounting elements 31 in the form of eyelets can be provided in the peripheral region of the base element 9 and fastened to the base element 9.

Figure 16:
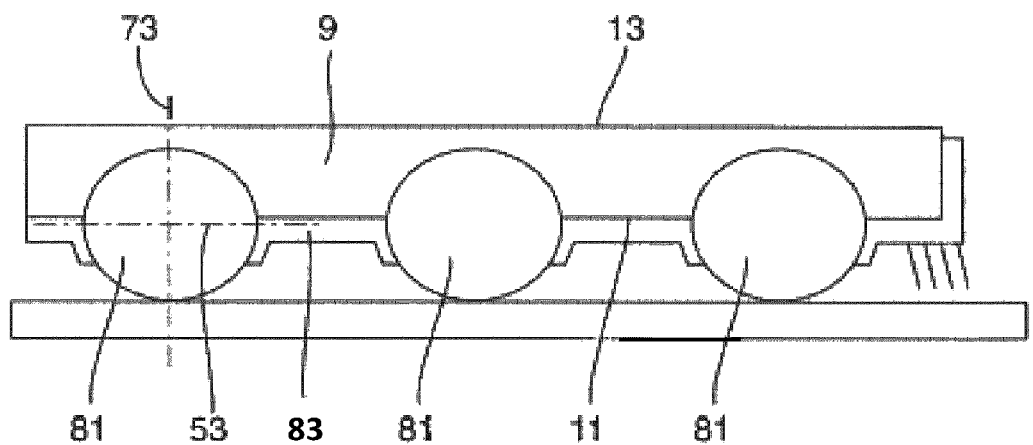
FIG. 16 shows a cross-sectional view of the base element of a freight carrier of a further example embodiment.

As can be seen in FIG. 16, the rolling elements in the example embodiment shown therein are configured as balls 81. The latter are received so as to be freely rotatable in a mount 83, provided on the base element 9 on the bearing face 11, in such a manner that the rotation axis 71 about which the balls 81 rotate when the freight carrier 7 is pushed across a floor area can be aligned in an arbitrary manner, the base element 9 of the freight carrier 7 being illustrated in FIG. 16. The freely rotatable balls 81 are received in the mount 83 such that part of the balls 81 extends from the mount 83 toward the floor area.

Because the balls 81 are received so as to be freely rotatable in the mount 83 it is ensured, on the one hand, that each ball 81 is rotatable about a rotation axis which is aligned in such a manner that a parallel to the rotation axis that extends through the contact point between the ball 81 and the floor area runs parallel to the floor plane. On the other hand, the balls 81 are also mounted on the base element 9 such that the rotation axis of the balls 81 is rotatable about a vertical axis which is parallel to an axis that, in the contact point between the ball and the floor area, runs perpendicularly to the floor plane.

As a result of the construction of the example embodiment shown in FIG. 16, having the balls 81 received in a freely rotatable manner it is made possible also here that the freight carrier 7 can be easily pushed across a flat floor area in arbitrary directions.

In the embodiments shown in FIGS. 13 to 16 it is advantageous for the rolling elements 69, 81 to have a high coefficient of friction in relation to the floor area of the cargo hold, so that it is ensured that the rolling elements 69, 81 actually roll and do not slide across the floor area.

A further advantage of the example embodiments shown in FIGS. 13 to 16 and described with reference thereto lies in that the rolling elements, i.e. the rollers 69 and the balls 81, only in a minor circumference project beyond the plane of the bearing face 11 that faces the floor area. The rolling elements can sink into the elastic material of a conveyor belt by way of this minor circumference such that the bearing face 11 bears directly on a conveyor belt when the freight carrier 7 according to these example embodiment bears on the conveyor belt. This in turn has the advantage that the freight carriers 7 in this instance can no longer roll on the conveyor belt and any movement relative to the latter is prevented.

The freight carriers 7 previously described with reference to FIGS. 13 to 16, conjointly with the conveying installation, thus form a system in which the elasticity of the conveyor belt and circumference by way of which the rolling elements 69, 81 project beyond the bearing face 11 are mutually adapted such that the rolling elements 69, 81 sink into the conveyor belt so far that the bearing face 11 comes to bear on the conveyor belt. The latter is illustrated in FIG. 13b in which the profile of the surface 84 of the conveyor belt is schematically illustrated.

The conveying installation of the system for transporting the freight carrier 7 by the revolving conveying belt, the freight carriers 7 to be placed on the surface 84 of the conveyor belt, can be disposed such that the conveyor belt extends from a loading region, adjacent to the apron on which the aircraft 1 to be loaded and the conveying installation are situated, to the loading hatch 5 of the aircraft 1.

Because the conveyor belt and the freight carriers 7 are mutually adapted in the manner described and the rolling elements 69, 81 sink into the conveyor belt so far that the conveyor belt bears on that bearing face of the freight carrier that faces the conveyor belt, it is reliably prevented that the freight carriers 7 shift on the conveyor belt when the conveyor belt runs so as to be inclined from the apron to the loading hatch 5 of the aircraft 1 to be loaded.

Figure 17:
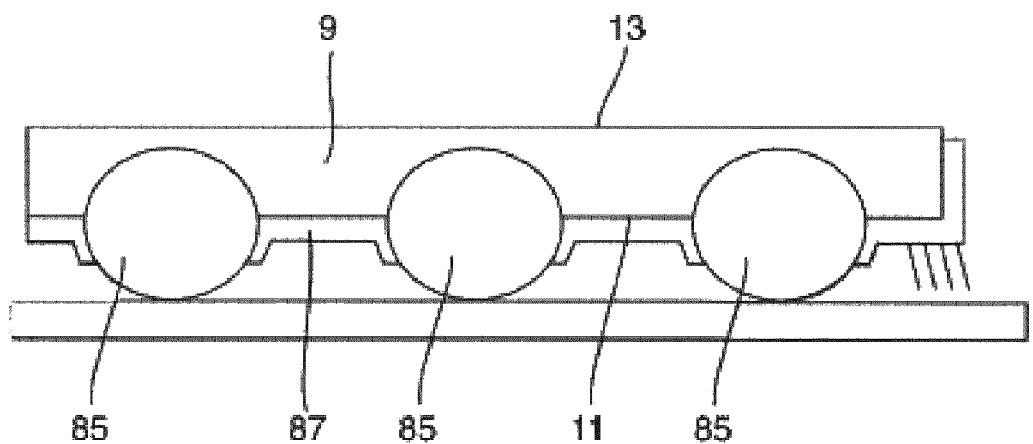
FIG. 17 shows a cross-sectional view of the base element of a freight carrier of a further example embodiment.

Shown in FIG. 17 is the cross section of the base element 9 of a further example embodiment of the freight carrier 7 which may be configured like the example embodiments described with reference to FIGS. 13 to 16, i.e. the base element 9 can likewise be configured as a rigid or flexible base plate or can have a multiplicity of segments which are pivotably connected to one another along pivot axes that preferably run so as to be mutually parallel. Moreover, the base element 9 in the manner already described can be provided with a flexible or rigid wall element 15.

As opposed to the example embodiment shown in FIG. 16, the bearing face 11 in the example embodiment of the freight carrier 7 shown in FIG. 17 is provided with sliding elements 85 which are mounted by a mount 87 on the bearing face 11 and enable shifting of the freight carrier 7 across the floor area. The material of the sliding elements 85 can be chosen such that the material has a low coefficient of friction in relation to the material of the floor area of the cargo hold of an aircraft.

The sliding elements 85 can in particular be designed in such a manner that a material pairing, i.e. the material of the sliding elements 85 combined with the material of the surface of the floor of the cargo hold 3 on which the sliding elements slide, in which a minor coefficient of friction is present is used.

In the preferred example embodiment shown here, the sliding elements 85 are releasably mounted, and thus easily replaceable, on the bearing face 11 in that the mount 87 can be released from the base element 9 and the sliding elements 85 are released as a result.

Felt or polytetrafluoroethylene (PTFE; "Teflon") can in particular be chosen as the material of the sliding elements 85. It is furthermore possible that the floor of the cargo hold 3 of the aircraft 1, in those regions in which the freight carriers 7 having the sliding elements 85 are to be displaced, is provided with a strip of a material which, conjointly with the sliding elements 85, leads to a minor coefficient of friction. This moreover makes it possible that only the strips can be replaced when wear occurs on the strips by virtue of the friction between the latter and the sliding elements 85, and wear does not occur on the floor per se.

In this way, this example embodiment of a freight carrier 7 can also be easily displaced across the floor area of a cargo hold of an aircraft without it being necessary that the floor area of the cargo hold or the bearing face of the freight carrier is provided with complicated assemblies.

The sliding elements 85 in a minor circumference project beyond the plane of the bearing face 11 that faces the floor area also in the example embodiment shown in FIG. 17 and described with reference thereto. The sliding elements 85 can sink into the elastic material of a conveyor belt by this minor circumference so that, when the freight carrier 7 according to this example embodiment bears on a conveyor belt, the bearing face 11 bears directly on the conveyor belt and the freight carriers 7 in this instance can no longer shift on the conveyor belt. Therefore, the freight carriers 7 previously described with reference to FIG. 17, conjointly with the conveying installation, form a system in which the elasticity of the conveyor belt and the circumference by way of which the sliding elements 85 project beyond the bearing face 11 are mutually adapted such that the sliding elements 85 sink into the conveyor belt so far that the bearing face 11 comes to bear on the conveyor belt. The latter corresponds to the previously described illustration from FIG. 13b.

For transporting the freight carriers 7 by the revolving conveyor belt, on the surface 84 of which the freight carriers 7 are placed, the conveying installation of the system can be disposed such that the conveyor belt extends from a loading region, adjacent to the apron on which the aircraft 1 to be loaded and the conveying installation are situated, to the loading hatch 5 of the aircraft 1. Because the conveyor belt and the freight carrier 7 are mutually adapted in the manner described, it is reliably prevented that the freight carriers 7 shift on the conveyor belt when the conveyor belt runs so as to be inclined from the apron to the loading hatch 5 of the aircraft 1 to be loaded. The further example embodiment of a freight carrier 7, the latter being shown in the cross section in FIG. 18, can be configured in a manner similar to that of the example embodiment described with reference to FIGS. 13 to 15. In the example embodiment shown in FIG. 18, the base element 9 is part of a wall for a receptacle space 17 enclosed by the freight carrier 7. The base element 9 here is configured as a rigid base plate.

In principle however, it is also possible that the base element 9 is configured as a flexible base plate or can have a multiplicity of segments which are pivotably connected to one another along pivot axes that preferably run so as to be mutually parallel.

Moreover, a wall element 15 can extend from the base element 9. The wall element 15 extends away from the base element 9 in particular on that side of the base area 13 that is configured on the base element 9 and lies opposite the bearing face 11, the wall element 15 surrounding a receptacle space 17 for receiving cargo. As has already been described, the wall element 15 can be produced from a flexible planar material and can furthermore have wall mounting elements 35 for fixing the freight carrier 7 in a cargo hold.

Figure 18:
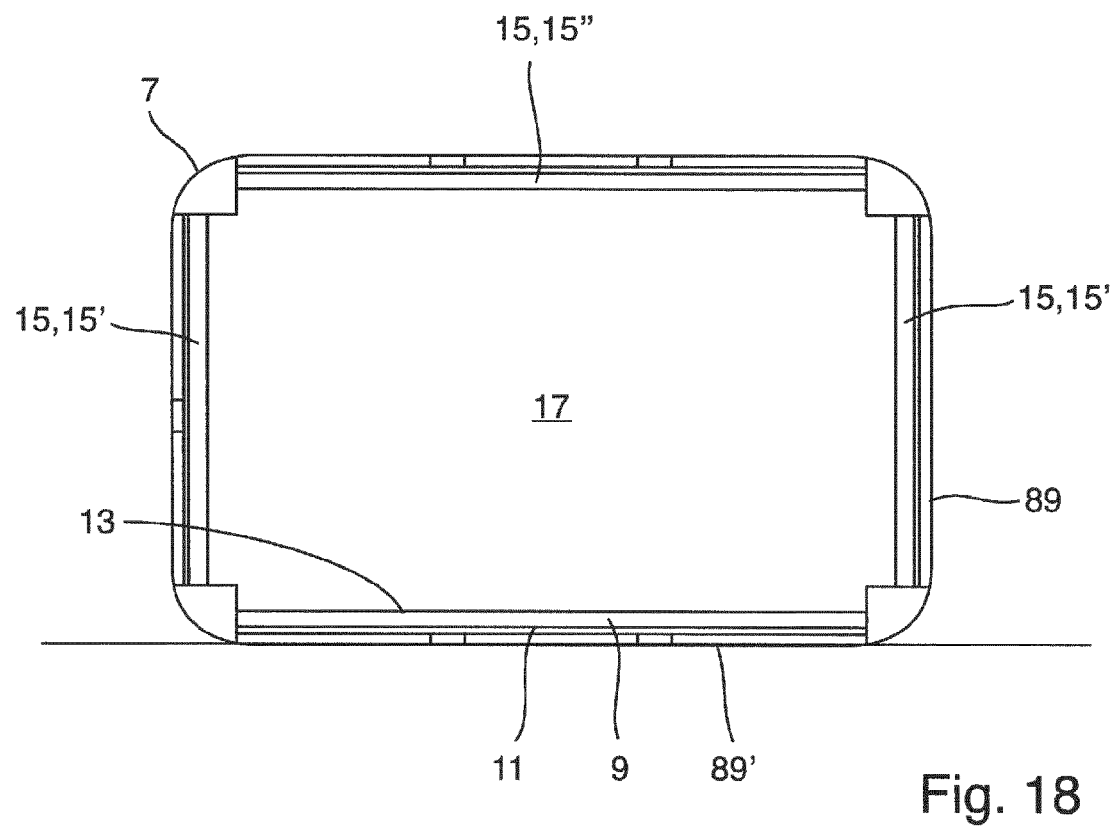
FIG. 18 shows a cross-sectional view of a freight carrier of a further example embodiment of the disclosure herein.

In the example embodiment illustrated in FIG. 18, the planar material of the wall element 15 is however configured so as to be rigid and dimensionally stable. The wall element 15 comprises in particular lateral walls 15', which extend away from the base element 9, and a ceiling wall 15".

The base element 9 also in this example embodiment has a bearing face 11 which is designed and disposed in such a manner that the freight carrier 7 according to the example embodiment shown in FIG. 18 can bear on a floor area of a cargo hold 3 of an aircraft 1 such that the bearing face 11 lies opposite the floor area, as is also schematically illustrated in FIG. 18. Moreover, the freight carrier 7 illustrated in FIG. 18 is designed so that the latter by way of the bearing face 11 that faces the floor area of a cargo hold can be pushed or moved across this floor area, as is yet to be explained hereunder.

As can furthermore be seen in FIG. 18, the example embodiment of a freight carrier 7 shown therein has a plurality of annular elements 89 revolving in mutually parallel orbital planes. The annular elements 89, which can be designed as a flexible belt, preferably configured from rubber, for example, here are mounted on the freight carrier 7 such that a portion 89' of the annular elements 89 extends along the bearing face 11 and is displaceable relative to thereto. The latter is achieved in that the annular elements 89 are guided in guides 91, which are shown in the cross section in FIG. 19 and are fixedly connected to the base element 9 or a wall element 15. The guides 91 in turn have bearing elements 93 which make it possible that the annular elements 89 can easily be displaced in relation to the guides 91 so that the annular elements 89, similar to the continuous tracks in a tracked vehicle, can revolve along the path defined by the guides 91.

In the example embodiment described here the wall element 15 is configured from a rigid and dimensionally stable material. Therefore, the lateral walls 15', along which the annular element 89 is guided, and the ceiling wall 15" can serve as a base element and the freight carrier 7 from FIG. 18 can be moved across the floor area of a cargo hold or any other area in an orientation other than that shown in FIG. 18.

Figure 19:
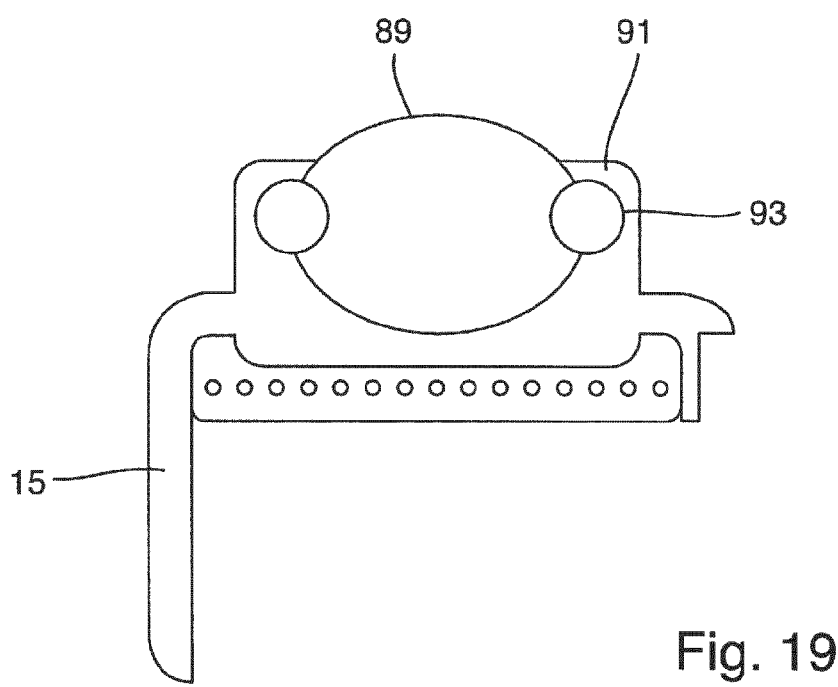
FIG. 19 shows a cross-sectional view of part of the freight carrier from FIG. 18.

In this way, the freight carrier 7 described with reference to FIGS. 18 and 19 can easily be displaced in a rectilinear manner along a path across the floor area of a cargo hold of an aircraft, the path running parallel to the orbital planes defined by the annular elements 89. It is advantageous for the annular elements 89 to have a high coefficient of friction in relation to the floor area of the cargo hold so that it is ensured that the annular elements 89 do not actually slide across the floor area but the annular elements 89 perform a revolving movement when the freight carrier 7 is displaced. The following procedure is in particular possible:

The freight carriers 7 shown in FIG. 18 are disposed on a conveyor belt that leads to the loading hatch provided laterally on an aircraft such that the orbital planes of the annular elements 89 extend perpendicularly to the transport direction of the conveyor belt. The freight carriers 7 in this alignment then make their way into the cargo hold of the aircraft where the freight carriers 7 then can easily be displaced along the longitudinal direction of the cargo hold in that the annular elements 89 can revolve about the freight carriers 7 in a manner similar to that of continuous tracks.

The portions 89' of the annular elements 89 in the region of the bearing face 11 project beyond the plane of the bearing face 11 only in a minor circumference also in the example embodiment shown in FIGS. 18 and 19 and described with reference thereto. The annular elements 89 can sink into the elastic material of a conveyor belt by this minor circumference so that, when the freight carrier 7 according to this example embodiment bears on a conveyor belt, the bearing face 11 bears directly on the conveyor belt and the freight carriers 7 in this instance can no longer shift on the conveyor belt. In this way, the freight carriers 7 previously described with reference to FIGS. 18 and 19, conjointly with the conveying installation, form a system in which the elasticity of the conveyor belt and the circumference by way of which the annular elements 89 project beyond the bearing face 11 are mutually adapted such that the annular elements 89 sink into the conveyor belt so far that the bearing face 11 comes to bear on the conveyor belt. Such an arrangement corresponds to that of the previously described illustration from FIG. 13*b*. The conveying installation of the system here can also be disposed such that the conveyor belt extends from a loading region, adjacent to the apron on which the aircraft 1 to be loaded and the conveying installation are situated, to the loading hatch 5 of the aircraft 1. Because the conveyor belt and the freight carrier 7 are mutually adapted in the described manner, it is likewise reliably prevented here that the freight carriers 7 shift on the conveyor belt when the conveyor belt run so as to be inclined from the apron to the loading hatch 5 of the aircraft 1 to be loaded.

In this example embodiment of a freight carrier 7, the further advantage that the area by way of which the annular elements 89 bear on the floor area of the cargo hold of aircraft is comparatively large results. This in turn leads to the absence of punctiform heavy loads or heavy loads restricted to a few points on the floor, and instead to a distribution of the load across a large area by the freight carriers 7.

In the example embodiment previously described with reference to FIG. 18, the annular element 89 is guided in such a manner that the latter revolves about the entire freight carrier 7 and in particular also the receptacle space 17 and thus the external wall of the freight carrier 7. However, it is also possible for the annular element 89 to revolve only about the base element 9. In the latter case, dissimilar elements of the wall cannot serve as a bearing face. This arrangement is however associated with the advantage that the receptacle space is flexible and the freight carrier 7 can also be more flexibly loaded.

Finally, in all previously described embodiments of freight carriers 7 according to the disclosure herein it is possible for the freight carriers 7 to be designed such that one or a plurality of wheelchairs can be received therein. In particular, the area of the base area 13 can be sized such that one or a plurality of wheelchairs can be received or deposited thereon. To this end, the base area 13 can also have correspondingly adapted fasteners such as straps for wheelchairs. The wall element 15 of such a freight carrier 7 can in particular be designed so as to be rigid and dimensionally stable so that wheelchairs that are received in the receptacle space 17 of the freight carrier 7 are not damaged. In such a design embodiment it is moreover advantageous for the freight carrier 7 to have data transmission by way of which the data pertaining to the content of the freight carrier 7, i.e. for example the number, the type or any information individually identifying the received wheelchairs, can be transmitted, preferably wirelessly, to a data network of an aircraft 1.

In a design embodiment of the freight carrier 7 for receiving wheelchairs it can furthermore be provided that expandable elements such as inflatable cushion elements by way of which the wheelchairs can be fixed in the receptacle space or protected against impact are provided on the wall element 15. If battery-operated wheelchairs are also to be received by the freight carrier 7, it can finally be advantageous to use heat-resistant and fire-resistant material for the wall element 15 and the base element 9 so that a fire in the cargo hold 3 of the aircraft 1 cannot occur in the event of great heat or fire being caused by the batteries.

Overall, the cargo hold of an aircraft can be loaded in a simple manner using all previously described embodiments of freight carriers as well as the systems comprising the latter, without complex additional systems being required in the cargo hold or on the freight carriers per se.

In some embodiments, the disclosure herein can comprise a freight carrier for accommodation in the cargo hold of an aircraft, having a base element that has a bearing face which is designed in such a manner that the freight carrier can bear on a floor area of a cargo hold of an aircraft such that the bearing face lies opposite the floor area;
   wherein the freight carrier is designed to be moved across the floor area extending in a floor plane such that the bearing face faces the floor area;
   wherein the base element has a base area which is disposed on that side of the base element that faces away from the bearing face, wherein the bearing face is provided with a multiplicity of rolling elements, wherein each of the rolling elements is rotatable about a rotation axis; wherein the rotation axis is aligned in such a manner that a parallel to the rotation axis that extends through the contact point between the rolling element and the floor area runs parallel to the floor plane; and
   wherein the rolling elements are mounted on the base element such that the rotation axis of each of the rolling elements is rotatable about a vertical axis which runs parallel to an axis that in the contact point between the rolling element and the floor area extends perpendicularly to the floor area.

In some embodiments, the disclosure herein can comprise the freight carrier as described above, wherein the rolling elements are configured as preferably cylindrical rollers which in a mount are mounted so as to be rotatable about the rotation axis of the rollers, and
   wherein the mount is attached to the floor area so as to be rotatable about the vertical axis.

In some embodiments, the disclosure herein can comprise the freight carrier as disclosed herein, wherein the rollers in the external face have at least one helically encircling groove.

In some embodiments, the disclosure herein can comprise the freight carrier as disclosed herein, wherein the rollers have mutually separate roller portions, and
   wherein the roller portions can be rotated about the rotation axis in a mutually independent manner.

In some embodiments, the disclosure herein can comprise the freight carrier as disclosed herein, wherein the rolling elements are configured as balls which, in a mount provided on the base element, are rotatably received in such a manner that the balls are freely rotatable, and part of the ball extends from the mount toward the floor area.

In some embodiments, the disclosure herein can comprise the freight carrier as disclosed herein, wherein the rolling elements in a circumference project beyond the bearing face of the base element, the circumference being chosen such that, when the freight carrier is situated on the conveyor belt of a conveying installation, the rolling elements sink into the conveyor belt and the bearing face bears on the conveyor belt.

In some embodiments, the disclosure herein can comprise a freight carrier for accommodation in the cargo hold of an aircraft, having a base element that has a bearing face which is designed in such a manner that the freight carrier can bear on a floor area of a cargo hold of an aircraft such that the bearing face lies opposite the floor area;
   wherein the freight carrier is designed to be moved across a floor area extending in a floor plane such that the bearing face faces the floor area;
   wherein the base element has a base area which is disposed on that side of the base element that faces away from the bearing face;
   wherein at least one annular element, which is mounted so as to revolve in an orbital plane on the freight carrier so that a portion of the at least one annular element extends along the bearing face and is displaceable relative to the latter, is provided; and
   wherein the portion of the at least one annular element is disposed on the bearing face in such a manner that, when the bearing face moves across the floor area, the portion bears on the floor area and is displaced in relation to the bearing face in the orbital plane.

In some embodiments, the disclosure herein can comprise the freight carrier as disclosed herein, wherein the annular element is configured as flexible belt, preferably configured from rubber.

In some embodiments, the disclosure herein can comprise the freight carrier as disclosed herein, wherein the annular element revolves about the external wall of the freight carrier.

In some embodiments, the disclosure herein can comprise the freight carrier as disclosed herein, wherein the annular element revolves about the base element.

In some embodiments, the disclosure herein can comprise the freight carrier as disclosed herein, wherein the annular element in a circumference projects beyond the bearing face of the base element, the circumference being chosen such that, when the freight carrier is situated on the conveyor belt of a conveying installation, the annular element sinks into the conveyor belt and the bearing face bears on the conveyor belt.

In some embodiments, the disclosure herein can comprise a freight carrier for accommodation in the cargo hold of an aircraft,
   having a base element that has a bearing face which is designed in such a manner that the freight carrier can bear on a floor area of a cargo hold of an aircraft such that the bearing face lies opposite the floor area;
   wherein the freight carrier is designed to be moved across a floor area extending in a floor plane such that the bearing face faces the floor area;

wherein the base element has a base area which is disposed on that side of the base element that faces away from the bearing face; wherein at least the bearing face is provided with sliding elements which enable the freight carrier to be displaced across the floor area.

In some embodiments, the disclosure herein can comprise the freight carrier as disclosed herein, wherein the sliding elements are releasably mounted on the bearing face.

In some embodiments, the disclosure herein can comprise the freight carrier as disclosed herein, wherein the material of the sliding elements comprises felt or polytetrafluoroethylene (PTFE; "Teflon").

In some embodiments, the disclosure herein can comprise the freight carrier as disclosed herein, wherein the sliding elements in a circumference project beyond the bearing face of the base element, the circumference being chosen such that, when the freight carrier is situated on the conveyor belt of a conveying installation, the sliding elements sink into the conveyor belt and the bearing face bears on the conveyor belt.

In some embodiments, the disclosure herein can comprise a system for loading a cargo hold of an aircraft with a freight element, comprising
- a freight carrier for receiving the freight element as disclosed herein, and
- a conveying installation for transporting the freight carrier, having a revolving conveyor belt onto which the freight carrier can be placed when transported and which is formed from an elastic material, wherein the conveyor belt can be disposed such that the latter extends from a loading region, adjacent to the apron on which the aircraft to be loaded and the conveying installation are situated, to a loading hatch of the aircraft;
- wherein the rolling elements of the freight carrier in a circumference project beyond the bearing face of the base element, the circumference being chosen such that, when the freight carrier is situated on the conveyor belt, the rolling elements sink into the conveyor belt and the bearing face of the freight carrier bears on the conveyor belt.

In some embodiments, the disclosure herein can comprise a system for loading a cargo hold of an aircraft with a freight element, comprising
- a freight carrier for receiving the freight element as disclosed herein, and
- a conveying installation for transporting the freight carrier, having a revolving conveyor belt onto which the freight carrier can be placed when transported and which is formed from an elastic material, wherein the conveyor belt can be disposed such that the latter extends from a loading region, adjacent to the apron on which the aircraft to be loaded and the conveying installation are situated, to a loading hatch of the aircraft;
- wherein the annular element of the freight carrier in a circumference projects beyond the bearing face of the base element, the circumference being chosen such that, when the freight carrier is situated on the conveyor belt of the conveying installation, the annular element sinks into the conveyor belt and the bearing face of the freight carrier bears on the conveyor belt.

In some embodiments, the disclosure herein can comprise a system for loading a cargo hold of an aircraft with a freight element, comprising
- a freight carrier for receiving the freight element as disclosed herein, and
- a conveying installation for transporting the freight carrier, having a revolving conveyor belt onto which the freight carrier can be placed when transported and which is formed from an elastic material, wherein the conveyor belt can be disposed such that the conveyor belt extends from a loading region, adjacent to the apron on which the aircraft to be loaded and the conveying installation are situated, to a loading hatch of the aircraft;
- wherein the sliding elements of the freight carrier in a circumference project beyond the bearing face of the base element, the circumference being chosen such that, when the freight carrier is situated on the conveyor belt of the conveying installation, the sliding elements sink into the conveyor belt and the bearing face of the freight carrier bears on the conveyor belt.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Aircraft
3 Cargo hold
5 Loading hatch
7 Freight carrier
9 Base element
9', 9", 9'" Segment
9"" Joint
11 Bearing face
13 Base area
15 Wall element
17 Receptacle space
19 Clearances
21 Base
23 Outlet opening
25 Line assembly
27 Connector
29 Line element
30 Sealing element
31 Base mounting element
33 Encircling edge
35 Wall mounting element
37 Connecting element
39, 39' Mounting element
41 Lateral face
43 First duct
45 Second duct
47 Inlet opening
49 Inlet opening
51 Second outlet openings
53 Plate 55 Connector plate
57 Second connector
59 Blower unit
61 Blower
63 Outlet
65 Flexible hose
67 Support belt assembly
69 Rollers
69a Roller portion
69b Roller portion
71 Rotation axis
73 Vertical axis
75 Mount
77 Receptacle
79 Groove
81 Balls
83 Mount
84 Surface of conveyor belt
85 Sliding elements
87 Mount
89 Annular element; belt
89' Portion of annular element
91 Guide
93 Bearing element

The invention claimed is:

1. A freight carrier for a cargo hold of an aircraft, the freight carrier comprising:
a base element that has a bearing face configured to bear on a floor area of a cargo hold of an aircraft;
a connector;
a connection assembly;
two parallel-running ducts; and
a first closing element;
wherein the base element has a base area, which is disposed on a side of the base element that faces away from the bearing face;
wherein the bearing face comprises outlet openings, through which air can exit the bearing face to form an air cushion between the bearing face and the floor area;
wherein the connection assembly connects the connector to the outlet openings;
wherein the connector is configured to be releasably connected to an outlet of a blower so that an air flow from the blower can be generated through the connector, through the connection assembly, and through and out of the outlet openings of the bearing face to form the air cushion;
wherein the base element has a lateral face which extends from the bearing face to the base area and encircles the base element;
wherein each of the ducts has at least one inlet opening in the lateral face and, from the inlet opening, extends parallel to the bearing face;
wherein the ducts are in the base element such that a fork of a forklift truck can be received in the ducts;
wherein the outlet openings are connected to a first one of the ducts such that an air flow from the first one of the ducts can be generated through the outlet openings, so the first one of the ducts is at least part of the connection assembly;
wherein the connector is connected to the first one of the ducts; and
wherein the first closing element is configured for closing at least one inlet opening of the first one of the ducts.

2. The freight carrier of claim 1, wherein the base element is a flexible base plate.

3. The freight carrier of claim 1, wherein the base element is a rigid base plate.

4. The freight carrier of claim 1, wherein the connection assembly is configured as:
a line assembly comprising a plurality of line portions which are between the outlet openings and the connector to fluidically connect the connector to the outlet openings; or
a cavity in the base element that is fluidically connected to the connector and the outlet openings.

5. The freight carrier of claim 1, comprising clearances which extend away from the bearing face so a base of the clearances is spaced apart from the bearing face;
wherein the outlet openings are disposed in the clearances or in the base of the clearances.

6. The freight carrier of claim 1, wherein the connector is in the base element.

7. The freight carrier of claim 2, wherein:
the connector is spaced apart from the base element; and
the freight carrier comprises a line element which extends from the base element to the connector and connects the connector to the line assembly.

8. The freight carrier of claim 1, comprising:
a second connector connected to a second one of the ducts; and
a second closing element;
wherein the bearing face comprises second outlet openings connected to a second one of the ducts, such that an air flow from the second one of the ducts can be generated through the second outlet openings;
wherein the second connector is configured to be releasably connected to the outlet of a blower, such that an air flow from the blower can be generated through the second connector, through the second one of the ducts, and through and out of the second outlet openings; and
wherein the second closing element is configured for closing at least one inlet opening of the second one of the ducts.

9. The freight carrier of claim 8, wherein:
the first closing element and the second closing element are configured as plates;
the connector is in the plate of the first closing element for closing the at least one inlet opening of the first one of the ducts; and
the second connector is in the plate of the second closing element for closing the at least one inlet opening of the second one of the ducts.

10. The freight carrier of claim 1, comprising a second closing element, wherein:
the bearing face comprises second outlet openings connected to a second one of the ducts, such that an air flow from the second one of the ducts can be generated through the second outlet openings, so that the second one of the ducts is at least part of the connection assembly;
the connector is connected to the second one of the ducts; and
the second closing element is configured for closing at least one inlet opening of the second one of the ducts.

11. The freight carrier of claim 10, wherein the first closing element and the second closing element are configured as plates.

12. The freight carrier of claim 1, wherein the base element has a plurality of segments configured to be mutually pivotable.

13. The freight carrier of claim 12, wherein pivot axes about which the segments are pivotable relative to one another run so as to be mutually parallel.

14. The freight carrier of claim 1, comprising a wall element which, on a side of the base area, extends away from the base element and surrounds a receptacle space, which extends away from the base area.

15. The freight carrier of claim 14, wherein the wall element is formed from a rigid, dimensionally stable planar material.

16. The freight carrier of claim 14, wherein the wall element is formed from a flexible planar material.

17. The freight carrier of claim 16, wherein wall mounting elements are on a peripheral region of the wall element remote from the base element.

18. A system for loading a cargo hold of an aircraft with a freight element, the system comprising:
a freight carrier comprising:
  a base element that has a bearing face configured to bear on a floor area of a cargo hold of an aircraft;
  a connector;
  a connection assembly;
  two parallel-running ducts; and
  a first closing element;
  wherein the base element has a base area, which is disposed on a side of the base element that faces away from the bearing face;
  wherein the bearing face comprises outlet openings, through which air can exit the bearing face to form an air cushion between the bearing face and the floor area;
  wherein the connection assembly connects the connector to the outlet openings;
  wherein the base element has a lateral face which extends from the bearing face to the base area and encircles the base element;
  wherein each of the ducts has at least one inlet opening in the lateral face and, from the inlet opening, extends parallel to the bearing face;
  wherein the ducts are in the base element such that a fork of a forklift truck can be received in the ducts;
  wherein the outlet openings are connected to a first one of the ducts such that an air flow from the first one of the ducts can be generated through the outlet openings, so the first one of the ducts is at least part of the connection assembly;
  wherein the connector is connected to the first one of the ducts; and
  wherein the first closing element is configured for closing at least one inlet opening of the first one of the ducts; and
a blower comprising:
  an outlet;
  wherein, during operation, the blower is configured to generate an air flow from the outlet;
  wherein the outlet and the connector are configured to be releasably connected to each other, such that the air flow from the outlet passes through the connector, through the connection assembly, and through and out of the outlet openings of the bearing face to form the air cushion during operation.

19. A method for loading a cargo hold of an aircraft with a freight element, the method comprising:
providing the system of claim 18;
placing the freight element on the base area of the base element of the freight carrier;
connecting the connector of the base element to the outlet of the blower and setting the blower in operation;
displacing the freight carrier along a floor area of the cargo hold; and
disconnecting the outlet of the blower from the connector.

20. The method of claim 19, comprising:
connecting a second connector to a second one of the ducts; and
providing a second closing element;
wherein the bearing face comprises second outlet openings connected to a second one of the ducts, such that an air flow from the second one of the ducts can be generated through the second outlet openings;
wherein the second connector is releasably connected to the outlet of a blower, such that an air flow from the blower can be generated through the second connector, through the second one of the ducts, and through and out of the second outlet openings; and
wherein the second closing element can close at least one inlet opening of the second one of the ducts.

21. The method of claim 20, wherein:
the first closing element and the second closing element are configured as plates;
the connector is in the plate of the first closing element for closing the at least one inlet opening of the first one of the ducts; and
the second connector is in the plate of the second closing element for closing the at least one inlet opening of the second one of the ducts.

22. The method of claim 19, comprising providing a second closing element, wherein:
the bearing face comprises second outlet openings connected to a second one of the ducts, such that an air flow from the second one of the ducts can be generated through the second outlet openings, so that the second one of the ducts is at least part of the connection assembly;
the connector is connected to the second one of the ducts; and
the second closing element is configured for closing at least one inlet opening of the second one of the ducts.

23. The method of claim 22, wherein the first closing element and the second closing element are configured as plates.

* * * * *

UNITED STATES PATENT AND TRADEMARK OFFICE
CERTIFICATE OF CORRECTION

PATENT NO. : 11,945,603 B2
APPLICATION NO. : 17/733660
DATED : April 2, 2024
INVENTOR(S) : Ralf Schliwa et al.

Page 1 of 1

It is certified that error appears in the above-identified patent and that said Letters Patent is hereby corrected as shown below:

In the Claims

Column 32, Line 19: "The freight carrier in claim 2" should be -- The freight carrier in claim 4 --.

Signed and Sealed this
Eighth Day of July, 2025

Coke Morgan Stewart
*Acting Director of the United States Patent and Trademark Office*